United States Patent
Goel (12)

(10) Patent No.: US 8,725,986 B1
(45) Date of Patent: May 13, 2014

(54) SYSTEM AND METHOD FOR VOLUME BLOCK NUMBER TO DISK BLOCK NUMBER MAPPING

(75) Inventor: Atul Goel, Foster City, CA (US)

(73) Assignee: NetApp, Inc., Sunnyvale, CA (US)

( * ) Notice: Subject to any disclaimer, the term of this patent is extended or adjusted under 35 U.S.C. 154(b) by 1188 days.

(21) Appl. No.: 12/105,609

(22) Filed: Apr. 18, 2008

(51) Int. Cl.
G06F 12/00 (2006.01)
G06F 13/00 (2006.01)
G06F 13/28 (2006.01)
G06F 9/26 (2006.01)
G06F 9/34 (2006.01)

(52) U.S. Cl.
USPC .......................................... 711/209; 711/114

(58) Field of Classification Search
None
See application file for complete search history.

(56) References Cited

U.S. PATENT DOCUMENTS

| | | | |
|---|---|---|---|
| 4,156,907 A | 5/1979 | Rawlings et al. | |
| 4,399,503 A | 8/1983 | Hawley | |
| 4,570,217 A | 2/1986 | Allen et al. | |
| 4,598,357 A | 7/1986 | Swenson et al. | |
| 4,688,221 A | 8/1987 | Nakamura et al. | |
| 4,698,808 A | 10/1987 | Ishii | |
| 4,761,785 A | 8/1988 | Clark et al. | |
| 4,805,090 A | 2/1989 | Coogan | |
| 4,837,675 A | 6/1989 | Bean et al. | |
| 4,843,541 A | 6/1989 | Bean et al. | |
| 4,864,497 A | 9/1989 | Lowry et al. | |
| 4,896,259 A | 1/1990 | Jacobs et al. | |
| 4,899,342 A | 2/1990 | Potter et al. | |
| 4,916,608 A | 4/1990 | Shultz | |
| 4,989,206 A | 1/1991 | Dunphy, Jr. et al. | |
| 5,124,987 A | 6/1992 | Milligan et al. | |
| 5,129,088 A | 7/1992 | Auslander et al. | |
| RE34,100 E | 10/1992 | Hartness | |
| 5,155,835 A | 10/1992 | Belsan | |
| 5,163,131 A | 11/1992 | Row et al. | |
| 5,202,979 A | 4/1993 | Hillis et al. | |
| 5,278,979 A | 1/1994 | Foster et al. | |
| 5,355,453 A | 10/1994 | Row et al. | |
| 5,426,747 A | 6/1995 | Weinreb et al. | |
| 5,485,579 A | 1/1996 | Hitz et al. | |
| 5,511,177 A | 4/1996 | Kagimasa et al. | |
| 5,568,629 A | 10/1996 | Gentry et al. | |
| 5,581,724 A | 12/1996 | Belsan et al. | |
| 5,764,972 A | 6/1998 | Crouse et al. | |

(Continued)

FOREIGN PATENT DOCUMENTS

| | | |
|---|---|---|
| EP | 0 617 358 | 9/1994 |
| WO | WO 02/29575 | 4/2002 |
| WO | WO 2008/133812 | 11/2008 |
| WO | WO 2009/058189 | 5/2009 |

OTHER PUBLICATIONS

IBM, IBM Informix Database Design and Implementation Guide, 2005, IBM, 2 pages.*

(Continued)

*Primary Examiner* — April Y Blair
*Assistant Examiner* — Gary W Cygiel
(74) *Attorney, Agent, or Firm* — Cesari and McKenna, LLP

(57) ABSTRACT

The present invention provides a system and method for virtual block numbers (VBNs) to disk block number (DBN) mapping that may be utilized for both single and/or multiple parity based redundancy systems. Following parity redistribution, new VBNs are assigned to disk blocks in the newly added disk and disk blocks previously occupied by parity may be moved to the new disk.

24 Claims, 16 Drawing Sheets

(56) References Cited

U.S. PATENT DOCUMENTS

| | | | |
|---|---|---|---|
| 5,802,366 A | 9/1998 | Row et al. | |
| 5,819,292 A | 10/1998 | Hitz et al. | |
| 5,828,876 A | 10/1998 | Fish et al. | |
| 5,832,513 A | 11/1998 | Kennedy | |
| 5,870,734 A | 2/1999 | Kao | |
| 5,897,661 A | 4/1999 | Baranovsky et al. | |
| 5,907,672 A | 5/1999 | Matze et al. | |
| 5,918,229 A | 6/1999 | Davis et al. | |
| 5,931,918 A | 8/1999 | Row et al. | |
| 5,941,972 A | 8/1999 | Hoese et al. | |
| 5,944,789 A | 8/1999 | Tzelnic et al. | |
| 5,963,962 A | 10/1999 | Hitz et al. | |
| 5,987,477 A | 11/1999 | Schmuck et al. | |
| 6,038,570 A | 3/2000 | Hitz et al. | |
| 6,061,770 A | 5/2000 | Franklin | |
| 6,081,875 A | 6/2000 | Clifton et al. | |
| 6,128,627 A | 10/2000 | Mattis et al. | |
| 6,148,368 A | 11/2000 | DeKoning | |
| 6,173,293 B1 | 1/2001 | Thekkath et al. | |
| 6,173,374 B1 | 1/2001 | Heil et al. | |
| 6,185,655 B1 | 2/2001 | Peping | |
| 6,240,527 B1 | 5/2001 | Schneider et al. | |
| 6,341,341 B1 | 1/2002 | Grummon et al. | |
| 6,397,311 B1 | 5/2002 | Capps et al. | |
| 6,457,021 B1 | 9/2002 | Berkowitz et al. | |
| 6,516,380 B2 | 2/2003 | Kenchammana-Hoskote et al. | |
| 6,571,261 B1 | 5/2003 | Wang-Knop et al. | |
| 6,606,690 B2 | 8/2003 | Padovano | |
| 6,618,798 B1 | 9/2003 | Burton et al. | |
| 6,636,879 B1 | 10/2003 | Doucette et al. | |
| 6,643,654 B1 | 11/2003 | Patel et al. | |
| 6,671,773 B2 | 12/2003 | Kazar et al. | |
| 6,721,764 B2 | 4/2004 | Hitz et al. | |
| 6,732,124 B1 | 5/2004 | Koseki et al. | |
| 6,804,706 B2 | 10/2004 | Pitts | |
| 6,868,417 B2 | 3/2005 | Kazar et al. | |
| 6,978,283 B1 | 12/2005 | Edwards et al. | |
| 6,993,701 B2 | 1/2006 | Corbett et al. | |
| 7,010,645 B2 | 3/2006 | Hetzler et al. | |
| 7,055,058 B2 | 5/2006 | Lee et al. | |
| 7,111,147 B1* | 9/2006 | Strange et al. | 711/209 |
| 7,127,577 B2 | 10/2006 | Koning et al. | |
| 7,194,597 B2 | 3/2007 | Willis et al. | |
| 7,231,412 B2 | 6/2007 | Hitz et al. | |
| 7,409,494 B2 | 8/2008 | Edwards et al. | |
| 7,590,807 B2 | 9/2009 | McGovern et al. | |
| 7,996,608 B1* | 8/2011 | Chatterjee et al. | 711/114 |
| 2004/0030668 A1 | 2/2004 | Pawlowski et al. | |
| 2005/0102551 A1* | 5/2005 | Watanabe | 714/5 |
| 2005/0246401 A1 | 11/2005 | Edwards et al. | |
| 2006/0184587 A1 | 8/2006 | Federwisch et al. | |
| 2006/0184731 A1* | 8/2006 | Corbett et al. | 711/114 |
| 2007/0088702 A1 | 4/2007 | Fridella et al. | |
| 2008/0270690 A1 | 10/2008 | English et al. | |
| 2009/0034377 A1 | 2/2009 | English et al. | |

OTHER PUBLICATIONS

Auspex Systems, LFS—A Local File System for Multiprocessor NFS Network Servers, 1994, 6 pages.
Chutani, Sailesh, et al., The Episode File System, In Proceedings of the USENIX Winter 1992, 18 pages.
Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001, 126 pages.
Finlayson, Ross S., et al., Log Files: An Extended File Service Exploiting Write-Once Storage Department of Computer Science, Stanford University, Report No. STAN-CS-87-1177, Sep. 1987, 14 pages.
Gait, Jason, Phoenix: A Safe In-Memory File System. Communications of the ACM, 33(1): pp. 81-86, Jan. 1990.
Hitz, Dave et al., File System Design for an NFS File Server Appliance, Technical Report 3002, Rev. C395, presented Jan. 19, 1994, 23 pages.
Howard, John H., An Overview of the Andrew File System, Carnegie Mellon University, CMU-ITC-88-062 1988, 6 pages.
Howard, John H, et al., Scale and Performance in a Distributed File System, Carnegie Mellon University, CMU-ITC-87-068, Aug. 5, 1987, 33 pages.
Howard, John, H. et al., Scale and performance in a distributed file system, ACM Trans. Computer. System., 6(1), Feb. 1988 pp. 51-81.
Kazar, Michael L., et al., Decorum File System Architectural Overview, USENIX Summer Conference, Anaheim, California, 1990, 13 pages.
Kazar, Michael L., Synchronization and Caching Issues in the Andrew File System, Carnegie Mellon University, CMU-ITC-88-063, 12 pages.
Lorie, Raymond, A, Physical Integrity in a large segmented database, ACM Trans. Database Systems, 2(1): 91-104, Mar. 1977.
Lorie, RA, Shadow Page Mechanism, IBM Technical Disclosure Bulletin, Jun. 1986, pp. 340-342.
McKusick, Marshall Kirk, et al., A Fast File System for UNIX, Computer Science Division, Department of Electrical Engineering and Computer Sciences, Univ. of CA, Berkley, Feb. 18, 1994, 14 pages.
Ousterhout, John K. et al., The Sprite Network Operating System, Computer Science Division, Department of Electrical Engineering and Computer Sciences, Univ. of CA, Berkley, Nov. 19, 1987, 32 pages.
Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988, 18 pages.
Ousterhout, John, Why Aren't Operating Systems Getting Faster as Fast as Hardware?, Digital WRL Technical Note TN-11, Oct. 1989, 20 pages.
Ousterhout, John, A Brief Retrospective on the Sprite Network Operating System, found at http://www.cs.berkeley.edu/projects/sprite/retrospective.html.visited on Mar. 11, 2005, 5 pages.
Patterson, D., et al., A Case for Redundant Arrays of Inexpensive Disks (RAID), Technical Report, CSD-87-391, Computer Science Division, Electrical Engineering and Computer Sciences, University of California at Berkeley (1987), 26 pages.
Peterson, Zachary Nathaniel Joseph, Data Placement for Copy-on-Write Using Virtual Contiguity, University of CA, Santa Cruz, Master of Science in Computer Science Thesis, Sep. 2002.
Quinlan, Sean, A Cached WORM File System, Software-Practice and Experience, 21(12):1289-1299 (1991).
Rosenberg, J., et al., Stability in a Persistant Store Based on a Large Virtual Memory, in Security and Persistence, Rosenber, J. & Keedy, J.L. (ed), Springer-Verlag (1990) pp. 229-245.
Rosenblum, Mendel, et al. The Design and Implementation of a Log-Structured File System Jul. 24, 1991 pp. 1-15.
Rosenblum, Mendel, The Design and Implementation of a Log-Structured File System, 1992, pp. 1-93.
Rosenblum, Mendel, et al., The Design and Implementation of a Log-Structured File System, In Proceedings of ACM Transactions on Computer Systems, (10)1:26-52, Feb. 1992.
Rosenblum, Mendel, et al., The LFS Storage Manager, Computer Science Division, Electrical Engin. and Computer Sciences, Univ. of CA, presented at Summer '90 USENIX Technical Conference, Anaheim, CA Jun. 1990, 16 pages.
Sandberg, Russel et al., Design and implementation of the Sun Network Filesystem. In Proc. Summer 1985 USENIX Conf., pp. 119-130, Portland OR (USA), Jun. 1985.
Santry, Douglas S., et al., Deciding When to Forget in the Elephant File System, Operating Systems Review, 34(5), (Dec. 1999) pp. 110-123.
Satyanarayanan, M., et al., The ITC Distributed File System: Principles and Design, In Proceedings of the 10th ACM Symposium on Operating Systems Principles, (19)5:56-67, Dec. 1985.
Satyanarayanan, M., A survey of distributed file-systems. Annual Review of Computing Science, 4(73-104), 1989.
Satyanarayanan, M., et al., Coda: A highly available file system for a distributed workstation environment Carnegie Mellon University, CMU-ITC.

(56) References Cited

OTHER PUBLICATIONS

Satyanarayanan, M., et al., Coda: A highly available file system for a distributed workstation environment. IEEE Transactions on Computers, 39(4):447-459, 1990.

Satyanarayanan, M., Scalable, Secure, and Highly Available Distributed File Access, Computer May 1990: 9-21.

Seltzer, Margo I., et al., Journaling Versus Soft Updates: Asynchronous Meta-Data Protection in File Systems, Proceedings of 200 USENIX Annual Technical Conference, Jun. 18-23, 2000.

Sidebotham, Bob, Volumes: The Andrew File System Data Structuring Primitive, EEUG Conference Proceedings, Manchester, UK, Autumn 1986.

West, Michael, et al. The ITC Distributed File System: Prototype and Experience, Carnegie-Mellon University, Technical Report CMU-ITC-040, Mar. 1985, 17 pages.

Zayas, Edward R., AFS-3 Programmer's Reference: Architectural Overview, Transarc Corporation, Pittsburgh, PA, 1.0 edition 1991, 37 pages.

"Notification of Transmittal of the International Search Report and the Written Opinion of the International Searching Authority, or the Declaration," International Filing Date: Apr. 14, 2008, International Application No. PCT/US2008/004763, Applicant: Network Appliance, Inc., Date of Mailing: Aug. 1, 2008, 12 pages.

"Notification of Transmittal of the International Search Report and the Written Opinion of the International Searching Authority, or the Declaration", International Filing Date: Oct. 6, 2008, International Application No. PCT/US2008/011502, Applicant: Network Appliance, Inc., Date of Mailing: Jan. 15, 2009, 11 pages.

Patterson, D.A. et al., "A Case for Redundant Arrays of Inexpensive Disks (RAID)", International Conference on Management of Data, Proceedings of the 1988 ACM SIGMOD International Conference on Management of Data, Chicago, Illinois, Jun. 1988, pp. 109-116.

\* cited by examiner

| | | | | |
|---|---|---|---|---|
| 0 | 8 | 16 | 24 | P |
| 1 | 9 | 17 | P | 25 |
| 2 | 10 | P | 26 | 18 |
| 3 | P | 19 | 27 | 11 |
| P | 12 | 20 | 28 | 4 |
| 5 | 13 | 21 | 29 | P |
| 6 | 14 | 22 | P | 30 |
| 7 | 15 | P | 31 | 23 |

FIG. 14

| 0 | 16 | 32 | 48 | P |
|---|---|---|---|---|
| 1 | 17 | 33 | P | 49 |
| 2 | 18 | P | 50 | 34 |
| 3 | P | 35 | 51 | 19 |
| P | 20 | 36 | 52 | 4 |
| 5 | 21 | 37 | 53 | P |
| 6 | 22 | 38 | P | 54 |
| 7 | 23 | P | 55 | 39 |
| 8 | 24 | 40 | 56 | P |
| 9 | 25 | 41 | P | 57 |
| 10 | 26 | P | 58 | 42 |
| 11 | P | 43 | 59 | 27 |
| P | 28 | 44 | 60 | 12 |
| 13 | 29 | 45 | 61 | P |
| 14 | 30 | 46 | P | 62 |
| 15 | 31 | P | 63 | 47 |

FIG. 15

SYSTEM AND METHOD FOR VOLUME BLOCK NUMBER TO DISK BLOCK NUMBER MAPPING

FIELD OF THE INVENTION

The present invention relates to storage arrays of storage systems and, more specifically, to mapping volume block numbers to disk block numbers in a storage device array, such as a disk array of a storage system.

BACKGROUND OF THE INVENTION

A storage system typically comprises one or more storage devices into which information may be entered, and from which information may be obtained, as desired. The storage system may be implemented in accordance with a variety of storage architectures including, but not limited to, a network-attached storage environment, a storage area network and a disk assembly directly attached to a client or host computer. The storage devices are typically disk drives, organized as one or more disk arrays, wherein the term "disk" commonly describes a self-contained rotating magnetic media storage device. The term "disk" in this context is synonymous with hard disk drive (HDD) or direct access storage device (DASD).

Storage of information on the disk array is illustratively implemented as one or more storage volumes of physical disks, defining an overall logical arrangement of storage space. The disks within a volume are typically organized as one or more groups, wherein each group is operated as a Redundant Array of Independent (or Inexpensive) Disks (RAID) or other suitable redundancy technique. Most RAID implementations enhance the reliability/integrity of data storage through the redundant writing of data "stripes" across a given number of physical disks in the RAID group, and the appropriate storing of redundant information with respect to the striped data. The redundant information enables recovery of data lost when a storage device fails.

In the operation of a disk array, it is anticipated that a disk can fail. A goal of a high performance storage system is to make the mean time to data loss (MTTDL) as long as possible, preferably much longer than the expected service life of the system. Data can be lost when one or more disks fail, making it impossible to recover data from the device. Typical schemes to avoid loss of data include mirroring, backup and/or parity protection. Mirroring is an expensive solution in terms of consumption of storage resources, such as disks. Backup does not protect data modified since the backup was created. Parity schemes are common because they provide a redundant encoding of the data that allows for a single erasure (loss of one disk) with the addition of just one disk drive to the system.

Parity protection is used in computer systems to protect against loss of data on a storage device, such as a disk. A parity value may be computed by summing (usually modulo 2) data of a particular word size (usually one bit) across a number of similar disks holding different data and then storing the results on an additional similar disk. That is, parity may be computed on vectors 1-bit wide, composed of bits in corresponding positions on each of the disks. When computed on vectors 1-bit wide, the parity can be either the computed sum or its complement; these are referred to as even and odd parity respectively. Addition and subtraction on 1-bit vectors are both equivalent to exclusive-OR (XOR) logical operations. The data is then protected against the loss of any one of the disks, or of any portion of the data on any one of the disks. If the disk storing the parity is lost, the parity can be regenerated from the data. If one of the data disks is lost, the data can be regenerated by adding the contents of the surviving data disks together and then subtracting the result from the stored parity.

Typically, the disks are divided into parity groups, each of which comprises one or more data disks and a parity disk. A parity set is a set of blocks, including several data blocks and one parity block, where the parity block is the XOR of all the data blocks. A parity group is a set of disks from which one or more parity sets are selected. The disk space is divided into stripes, with each stripe containing one block from each disk. The blocks of a stripe are usually at the same locations on each disk in the parity group. Within a stripe, all but one block are blocks containing data ("data blocks") and one block is a block containing parity ("parity block") computed by the XOR of all the data. If the parity blocks are all stored on one disk, thereby providing a single disk that contains all (and only) parity information, a RAID-4 implementation is provided. If the parity blocks are contained within different disks in each stripe, usually in a rotating pattern, then the implementation is RAID-5. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988 and U.S. Pat. No. 6,993,701, issued on Jan. 31, 2006, for a ROW-DIAGONAL PARITY TECHNIQUE FOR ENABLING EFFICIENT RECOVERY FROM DOUBLE FAILURES IN A STORAGE ARRAY, by Peter Corbett, et al.

As used herein, the term "encoding" means the computation of a redundancy value over a predetermined subset of data blocks, whereas the term "decoding" means the reconstruction of a data or parity block by using a subset of data blocks and redundancy values. If one disk fails in the parity group, the contents of that disk can be decoded (reconstructed) on a spare disk or disks by adding all the contents of the remaining data blocks and subtracting the result from the parity block. Since two's complement addition and subtraction over 1-bit fields are both equivalent to XOR operations, this reconstruction consists of the XOR of all the surviving data and parity blocks. Similarly, if the parity disk is lost, it can be recomputed in the same way from the surviving data.

A noted disadvantage of such RAID implementations, particularly a RAID implementation utilizing distributed parity, e.g., RAID 5, involves a mapping technique of logical storage blocks identified by logical block numbers, e.g., volume block numbers (VBN) to physical storage block locations on disk identified by disk block numbers (DBN). The VBNs are typically utilized by a high-level module, such as a file system, executing on the storage system, while the DBNs are typically utilized by a low-level module, such as a RAID and/or disk driver module of the system. The VBNs represent logical block locations in a logical VBN storage space typically spanning multiple disks or other physical storage devices and the DBNs represent physical block locations in a physical DBN storage space. The noted disadvantage arises as each disk of the RAID implementation stores both data and parity blocks, and may be exacerbated when an objective of the implementation is to support seamless disk additions. Since file systems generally only read/write data blocks (i.e., parity blocks are "hidden" from the file system), the technique utilized to map logical blocks to their physical disk block locations must be sufficiently "intelligent" to skip the parity blocks. In addition, seamless disk additions require that the mapping techniques handle any incremental growth of the VBN and DBN storage spaces. To ensure a balanced/uniform distribution of parity blocks across all disks even after a disk addition (single or multiple), some physical block locations (i.e., DBNs) occupied by parity must now store user data instead. As a result, the mapping technique must be able to handle the conversion of parity blocks to data blocks, which may be triggered, e.g., as a result of the relocation of parity during disk addition. Conventional distributed parity architectures such as RAID 5 have generally been configured for file systems that utilize a flat, one-dimensional address storage space. The VBN to DBN mapping techniques for these configurations have typically been simple, as these techniques do not support disk additions. Those techniques that do support disk additions typically resort to extremely expensive parity re-computation and/or block copy operations.

However, disk topology aware file systems, such as the Write Anywhere File Layout (WAFL®) file system available from NetApp of Sunnyvale, Calif., may exploit knowledge of the layout of a disk array to implement highly efficient write operations. Typically, disk topology aware file systems utilize RAID 4 implementations that store the parity on dedicated disk drives, thereby obviating the need for the file system to be aware of the dedicated parity disks. RAID 4 implementation works because a disk topology aware file system has the advantage of being able to implement efficient write operations (e.g. efficient stripe updates) where the cost of updating parity is amortized over many updates to data blocks in nearby stripes.

A distributed parity organization, on the other hand, e.g. RAID-5, has the advantage of providing higher IOPs since all disk spindles are available for read operations. The obvious approach for implementing a distributed parity layout in a disk-topology-aware filesystem is to include parity blocks within the VBN space. With this scheme expansion by disk addition is easy. However, this approach suffers from many shortcomings. For example, this approach limits the VBN space which can be used for client data since some part of the address space is consumed by parity, thereby restricting the size of the maximum aggregate or flexvol which can be created. Secondly, filesystem management becomes complicated since constructs like allocation maps, active map, summary map, etc. must now be aware of parity blocks and must appropriately account for them when processing user operations. Finally, backup operations which use snapshots as the underlying mechanism require identical source destination geometries, thus severely limiting configurations.

SUMMARY OF THE INVENTION

The present invention overcomes the disadvantages of the prior art to providing a system and method for volume block number (VBN) to disk block number (DBN) mapping that may be utilized for both single and/or multiple parity based redundancy systems. Illustratively one of a plurality of parity distribution techniques is utilized to determine a new parity layout of a disk array organized into one or more Redundant Array of Inexpensive Disk (RAID) groups as the result of adding disks to a RAID group. Following parity (re)distribution, new VBNs are assigned to DBNs in the newly added disk and DBNs on older drives which stored parity blocks that were relocated to the new disk. By utilizing the programmatic assignment of VBNs, the present invention obviates the need to use persistently stored mapping/translation tables for each VBN/DBN relationship. In an illustrative embodiment of the present invention, flexible volumes stored within aggregates are utilized. In such embodiments, a physical volume block number (PVBN) may be utilized in place of a VBN. As such, the terms PVBNs and VBNs may be used interchangeably in describing the present invention.

The present invention permits the calculation of a PVBN value that is identified by a given DBN by first computing a table relative PVBN and identifying a logical disk number. The start (i.e., PVBN value of the first block) of the PVBN range, corresponding to the logical disk number, containing the desired PVBN is identified and the PVBN value is computed by adding a striped value to the start of the identified PVBN range.

Similarly, given a PVBN, the corresponding DBN may be identified by first computing a logical disk number for the PVBN and then computing a stripe by, e.g., subtracting a start of a PVBN range from the given PVBN. The PVBN is then converted to a table relative PVBN and the disk that stores the DBN is identified. The DBN on the identified disk is then identified as the block represented by the computed stripe on the identified disk. More generally, the present invention enables improved VBN-DBN mapping functionality to improve system performance and to enable dynamic disk additions to disk arrays utilizing distributed parity.

The present invention enables seamless parity block reallocations due to, e.g., a disk addition. The present invention also ensures that the arrangement of VBNs is computed in a manner such that the set of VBNs within a stripe is the same as the set which would be formed when using a dedicated parity organization, e.g., RAID 4. This holds true both with the initial organization at the moment a raidgroup is created as well as subsequent to expansion via disk additions. This property ensures that the filesystem can be oblivious to the placement of parity blocks and/or the redundancy level (e.g., single or double parity) of the underlying RAID array and can treat both RAID 4 and distributed parity organization in an identical manner. This greatly simplifies filesystem design and also provides a great deal of flexibility in configuring the underlying RAID array. Furthermore, by obviating the need for a static mapping table, the present invention gives greater flexibility for disk topology aware file systems.

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 14 is a schematic block diagram of a mapping table in accordance with an illustrative embodiment of the present invention;

FIG. 15 is a schematic block diagram illustrating an exemplary 5 disk RAID array that stores two repetitions of mapping table in accordance with an illustrative embodiment of the present invention;

DETAILED DESCRIPTION OF THE ILLUSTRATIVE EMBODIMENTS

Figure 1:
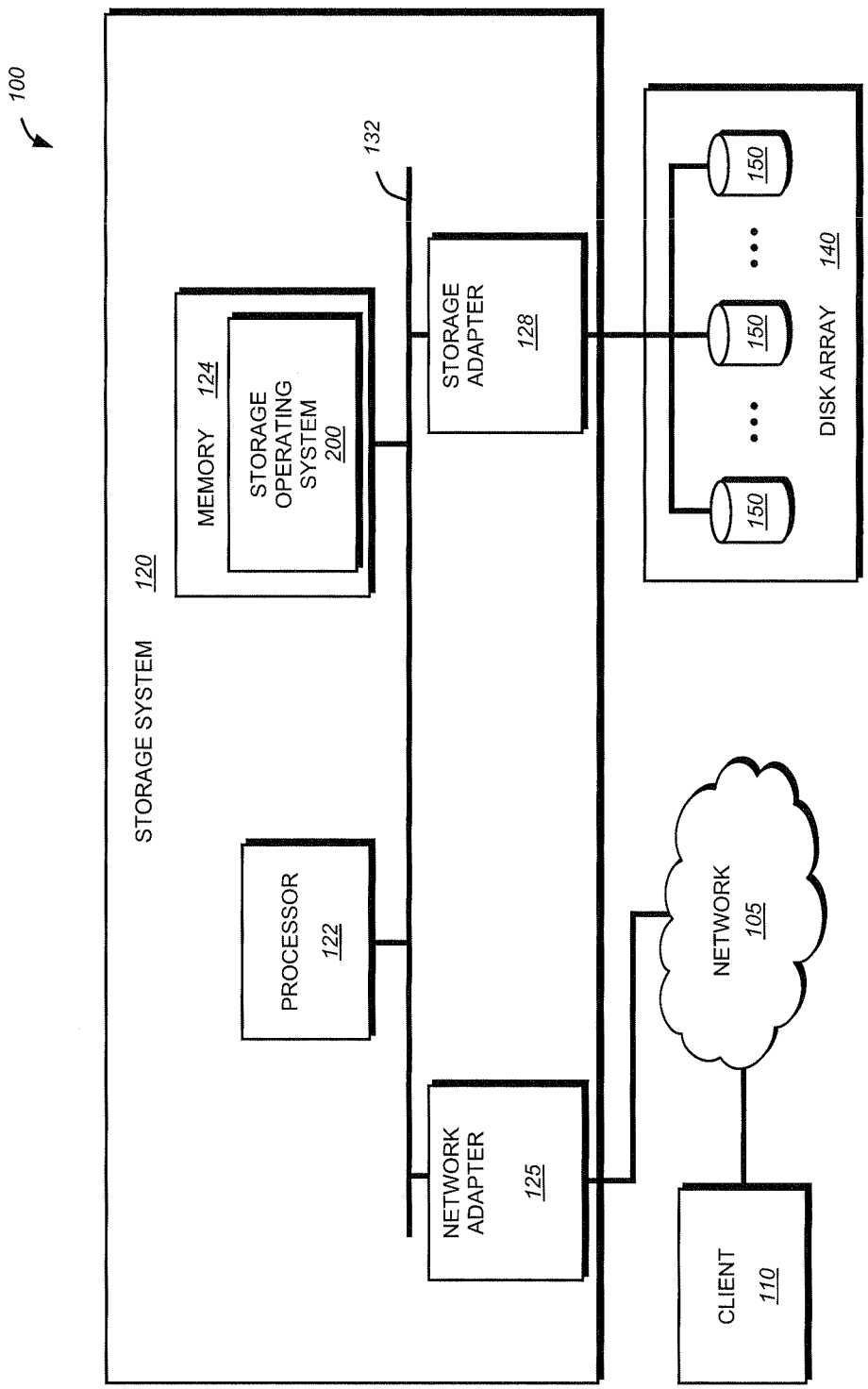
FIG. 1 is a schematic block diagram of a storage system environment including a storage system in accordance with an illustrative embodiment of the present invention.

The present invention provides a system and method for volume block number (VBN) to disk block number (DBN) mapping that may be utilized for both single and/or multiple parity based redundancy systems. Illustratively one of a plurality of parity distribution techniques is utilized to determine a new parity layout of a disk array organized into one or more Redundant Array of Inexpensive Disk (RAID) groups as the result of adding disks to a RAID group. Following parity (re)distribution, new VBNs are assigned to DBNs in the newly added disk and DBNs on older drives which stored parity blocks that were relocated to the new disk. By utilizing the programmatic assignment of VBNs, the present invention obviates the need to use persistently stored mapping/translation tables for each VBN/DBN relationship. In an illustrative embodiment of the present invention, flexible volumes stored within aggregates are utilized. In such embodiments, a physical volume block number (PVBN) may be utilized in place of a VBN. As such, the terms PVBNs and VBNs may be used interchangeably in describing the present invention.

The present invention permits the calculation of a PVBN value that is identified by a given DBN by first computing a table relative PVBN and identifying a logical disk number. The start (i.e., PVBN value of the first block) of the PVBN range, corresponding to the logical disk number, containing the desired PVBN is identified and the PVBN value is computed by adding a striped value to the start of the identified PVBN range.

Similarly, given a PVBN, the corresponding DBN may be identified by first computing a logical disk number for the PVBN and then computing a stripe by, e.g., subtracting a start of a PVBN range from the given PVBN. The PVBN is then converted to a table relative PVBN and the disk that stores the DBN is identified. The DBN on the identified disk is then identified as the block represented by the computed stripe on the identified disk. More generally, the present invention enables improved VBN-DBN mapping functionality to improve system performance and to enable dynamic disk additions to disk arrays utilizing distributed parity.

The present invention enables seamless parity block reallocations due to, e.g., a disk addition. The present invention also ensures that the arrangement of VBNs is computed in a manner such that the set of VBNs within a stripe is the same as the set which would be formed when using a dedicated parity organization, e.g., RAID 4. This holds true both with the initial organization at the moment a raidgroup is created as well as subsequent to expansion via disk additions. This property ensures that the filesystem can be oblivious to the placement of parity blocks and/or the redundancy level (e.g., single or double parity) of the underlying RAID array and can treat both RAID 4 and distributed parity organization in an identical manner. This greatly simplifies filesystem design and also provides a great deal of flexibility in configuring the underlying RAID array. Furthermore, by obviating the need for a static mapping table, the present invention gives greater flexibility for disk topology aware file systems.

A. Storage System Environment

FIG. 1 is a schematic block diagram of an environment 100 including a storage system 120 that may be advantageously used with the present invention. The inventive technique described herein may apply to any type of special-purpose (e.g., file server or filer) or general-purpose computer, including a standalone computer or portion thereof, embodied as or including a storage system 120. Moreover, the teachings of this invention can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

In the illustrative embodiment, the storage system 120 comprises a processor 122, a memory 124, a network adapter 125 and a storage adapter 128 interconnected by a system bus 132. The memory 124 comprises storage locations that are addressable by the processor and adapters for storing software program code and data structures associated with the present invention. The processor and adapters may, in turn, comprise processing elements and/or logic circuitry configured to execute the software code and manipulate the data structures. A storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the inventive technique described herein.

The network adapter 125 comprises a plurality of ports adapted to couple the storage system 120 to one or more clients 110 over point-to-point links, wide area networks, virtual private networks implemented over a public network (Internet) or a shared local area network (hereinafter "network 105"). The network adapter 125 thus may comprise the mechanical, electrical and signaling circuitry needed to connect the storage system to the network 105, such as a computer network. Illustratively, the network 105 may be embodied as an Ethernet network or a Fibre Channel (FC) network. Each client 110 may communicate with the storage system 120 over network 105 by exchanging discrete frames or packets of data according to pre-defined protocols, such as TCP/IP.

The storage adapter 128 cooperates with the storage operating system 200 executing on the system 120 to access information requested by a user (or client). The information may be stored on any type of attached array of writeable storage device media such as video tape, optical, DVD, magnetic tape, bubble memory, electronic random access memory (including Flash memory), micro-electro mechanical and any other similar media adapted to store information, including data and parity information. However, as illustratively described herein, the information is preferably stored on disks 150, such as HDD and/or DASD, of array 140. The storage adapter includes input/output (I/O) interface circuitry that couples to the disks over an I/O interconnect arrangement, such as a conventional high-performance, FC serial link topology.

Storage of information on array 140 is preferably implemented as one or more storage "volumes" that comprise a cluster of physical storage disks 150, defining an overall logical arrangement of disk space. Each volume is generally, although not necessarily, associated with its own file system. The disks within a volume/file system are typically organized as one or more groups, wherein each group is operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of parity information with respect to the striped data.

B. Storage Operating System

To facilitate access to the disks, the storage operating system 200 implements a write-anywhere file system that cooperates with virtualization modules to provide a system that "virtualizes" the storage space provided by disks. The file system logically organizes the information as a hierarchical structure of named data containers, such as directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named data containers, such as virtual disk objects (vdisks) on the disks, thereby providing an integrated NAS and SAN system approach to storage by enabling file-based (NAS) access to the files and directories, while further enabling block-based (SAN) access to the vdisks on a file-based storage platform.

In the illustrative embodiment, the storage operating system is preferably the NetApp® Data ONTAP® operating system available from NetApp, Inc., Sunnyvale, Calif. that implements a Write Anywhere File Layout (WAFL®) file system. However, it is expressly contemplated that any appropriate storage operating system, including a write in-place file system, may be enhanced for use in accordance with the inventive principles described herein. As such, where the term "Data ONTAP" is employed, it should be taken broadly to refer to any storage operating system that is otherwise adaptable to the teachings of this invention.

As used herein, the term "storage operating system" generally refers to the computer-executable code operable on a computer that manages data access and may, in the case of a storage system, implement data access semantics, such as the Data ONTAP® storage operating system, which is implemented as a microkernel. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 2:
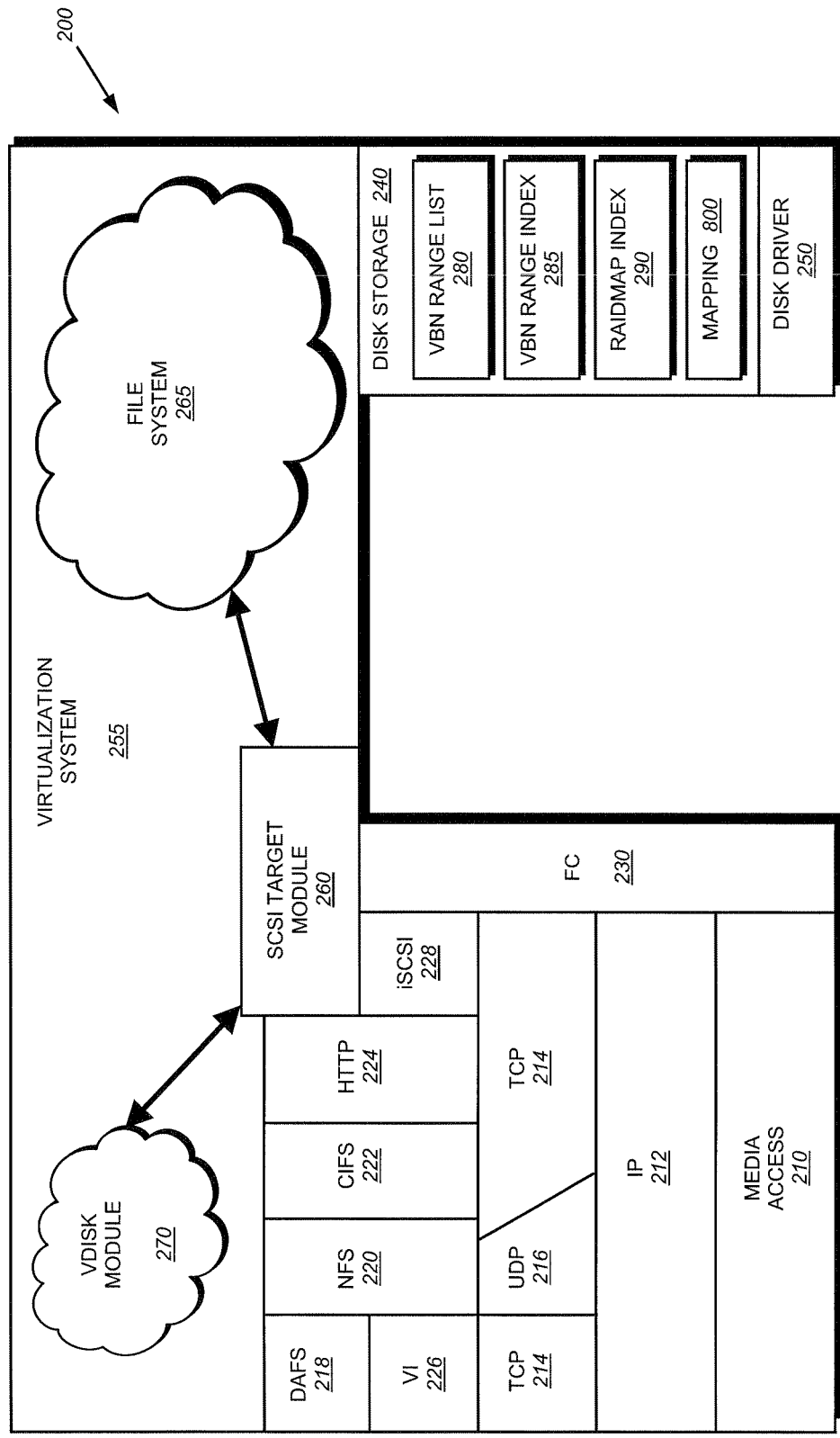
FIG. 2 is a schematic block diagram of an exemplary storage operating system for use on a storage system in accordance with an illustrative embodiment of the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the multi-protocol storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the DAFS protocol 218, the Network File System (NFS) protocol 220, the Common Internet File System (CIFS) protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 operates with the network adapter to receive and transmit block access requests and responses to and from the storage system. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the storage system. In addition, the storage operating system includes a disk storage layer 240, such as a RAID system, that implements a disk storage protocol, such as a RAID protocol, and a disk driver layer 250 that implements a disk access protocol such as, e.g., a SCSI protocol.

In an illustrative embodiment of the present invention, the disk storage layer (e.g., RAID system 240) implements the novel VBN-DBN mapping technique. Illustratively, the disk storage layer 240 exports disk topology information, e.g., a mapping of VBN to DBN storage spaces to the virtualization system 255 for use by the file system 265. In the exemplary embodiment where the file system 265 comprises a disk topology aware file system, such as the above-mentioned WAFL file system, the file system 265 utilizes the exported disk topology information to improve write operations. It should be noted that the present invention may be utilized with file systems that are not disk topology aware. Furthermore, it should be noted that the implementation of the VBN-DBN mapping technique of the present invention may be implemented in other modules of the storage operating system 200. As such the description of the VBN-DBN mapping being implemented by disk storage layer 240 should be taken as exemplary only. It should be further noted that while the present invention is written in terms of VBN (or PVBN) to DBN mapping, the principles of the present invention may be utilized with any logical block to physical disk block mapping arrangement. As such, the description of VBN (PVBN) to DBN mapping should be taken as exemplary only. Illustratively, the disk storage module 240 includes one or more exemplary mapping data structures 800, described further below in reference to FIG. 8. The mapping data structure 800 is utilized by the disk storage module 240 to store information for use in performing the novel VBN-DBN mapping in accordance with an illustrative embodiment of the present invention.

Furthermore, in an illustrative embodiment of the present invention, the disk storage module 240 includes a VBN range list data structure 280, a VBN range index data structure 285 and a raidmap data structure 290. The VBN range list data structure 280 illustratively contains a list of each VBN range stored on a RAID group. The VBN range index data structure 285 contains an index that maps logical block numbers to a VBN range within the VBN range data structure 280. The raidmap index data structure 290 contains an index that maps disk numbers to raidmaps that identify physical disks.

Bridging the disk software layers with the integrated network protocol stack layers is a virtualization system 255 that is implemented by a file system 265 interacting with virtualization modules illustratively embodied as, e.g., vdisk module 270 and SCSI target module 260. It should be noted that the vdisk module 270, the file system 265 and SCSI target module 260 can be implemented in software, hardware, firmware, or a combination thereof. The vdisk module 270 interacts with the file system 265 to enable access by administrative interfaces in response to a system administrator issuing commands to the storage system 120. In essence, the vdisk module 270 manages SAN deployments by, among other things, implementing a comprehensive set of vdisk (lun) commands issued through a user interface by a system administrator. These vdisk commands are converted to primitive file system operations ("primitives") that interact with the file system 265 and the SCSI target module 260 to implement the vdisks.

The SCSI target module 260, in turn, initiates emulation of a disk or lun by providing a mapping procedure that translates luns into the special vdisk file types. The SCSI target module is illustratively disposed between the FC and iSCSI drivers 230, 228 and the file system 265 to thereby provide a translation layer of the virtualization system 255 between the SAN block (lun) space and the file system space, where luns are represented as vdisks. By "disposing" SAN virtualization over the file system 265, the storage system reverses the approaches taken by prior systems to thereby provide a single unified storage platform for essentially all storage access protocols.

The file system 265 is illustratively a message-based system; as such, the SCSI target module 260 transposes a SCSI request into a message representing an operation directed to the file system. For example, the message generated by the SCSI target module may include a type of operation (e.g., read, write) along with a pathname (e.g., a path descriptor) and a filename (e.g., a special filename) of the vdisk object represented in the file system. The SCSI target module 260 passes the message into the file system 265 as, e.g., a function call, where the operation is performed.

The file system 265 illustratively implements the WAFL file system having an on-disk format representation that is block-based using, e.g., 4 kilobyte (KB) blocks and using modes to describe the files. The WAFL file system uses files to store metadata describing the layout of its file system; these metadata files include, among others, an mode file. A file handle, i.e., an identifier that includes an mode number, is used to retrieve an mode from disk. A description of the structure of the file system, including on-disk modes and the mode file, is provided in the U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al.

Operationally, a request from the client 110 is forwarded as a packet over the computer network 105 and onto the storage system 120 where it is received at the network adapter 125. A network driver processes the packet and, if appropriate, passes it on to a network protocol and file access layer for additional processing prior to forwarding to the write-anywhere file system 265. Here, the file system generates operations to load (retrieve) the requested data from disk 150 if it is not resident "in-core," i.e., in the memory 124. If the information is not in the memory, the file system 265 indexes into the mode file using the mode number to access an appropriate entry and retrieve a logical VBN. The file system then passes a message structure including the logical VBN to the RAID system 240; the logical VBN is mapped to a disk identifier and DBN (disk,DBN) and sent to an appropriate driver (e.g., SCSI) of the disk driver system 250. The mapping of the logical VBN to the DBN is illustratively performed using the present invention as described further below. The disk driver accesses the DBN from the specified disk 150 and loads the requested data block(s) in memory for processing by the storage system. Upon completion of the request, the storage system (and operating system) returns a reply to the client 110 over the network 105.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in another alternate embodiment of the invention, the processing elements of adapter 125, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may implement file system semantics. In this sense, the Data ONTAP software is an example of such a storage operating system implemented as a microkernel and including a file system layer to implement file system semantics and manage data access. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., file server, filer or storage system) or general-purpose computer, including a standalone computer or portion thereof, embodied as or including a storage system 120. An example of a storage system that may be advantageously used with the present invention is described in U.S. Pat. No. 7,873,700, issued on Jan. 18, 2011, entitled, MULTI-PROTOCOL STORAGE APPLIANCE THAT PROVIDES INTEGRATED SUPPORT FOR FILE AND BLOCK ACCESS PROTOCOLS, by Brian Pawlowski, et al. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

C. File System Arrangement

Figure 3:
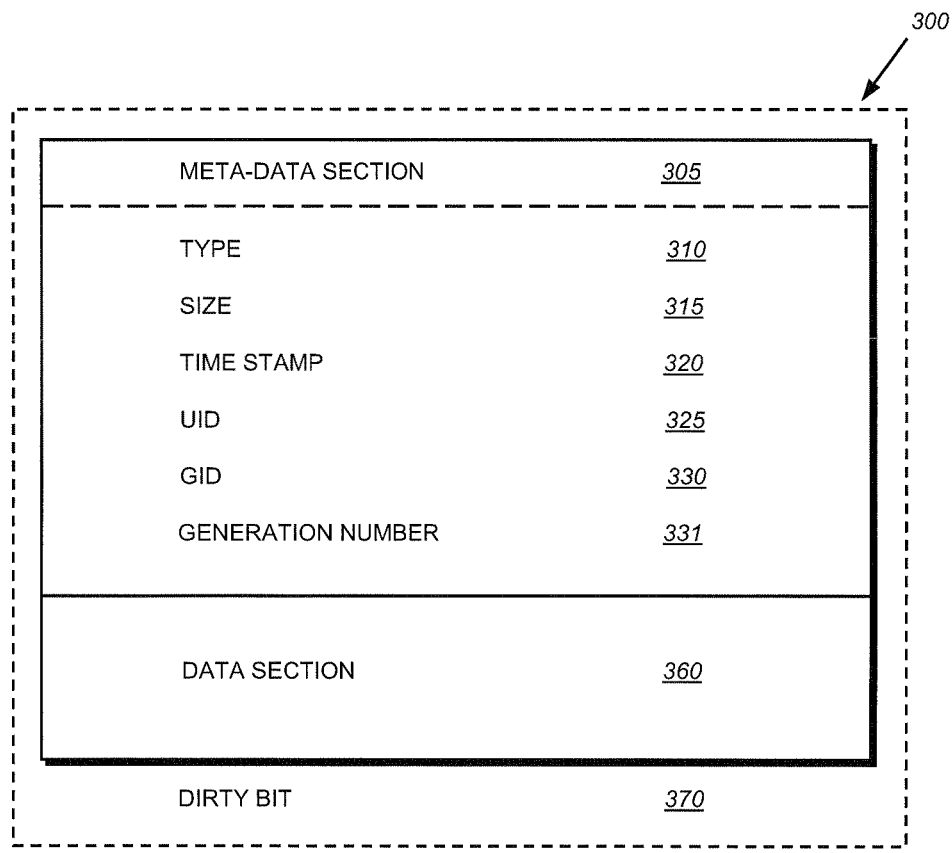
FIG. 3 is a schematic block diagram of an exemplary mode in accordance with an illustrative embodiment of the present invention.

In the illustrative embodiment, a data container is represented in the write-anywhere file system as an mode data structure adapted for storage on the disks 150. FIG. 3 is a schematic block diagram of an mode 300, which preferably includes a meta-data section 305 and a data section 360. The information stored in the meta-data section 305 of each mode 300 describes the data container (e.g., a file) and, as such, includes the type (e.g., regular, directory, vdisk) 310 of file, its size 315, time stamps (e.g., access and/or modification time) 320 and ownership, i.e., user identifier (UID 325) and group ID (GID 330), of the file. The meta-data section 305 also includes a generation number 331. The contents of the data section 360 of each mode may be interpreted differently depending upon the type of file (mode) defined within the type field 310. For example, the data section 360 of a directory mode contains meta-data controlled by the file system, whereas the data section of a regular mode contains file system data. In this latter case, the data section 360 includes a representation of the data associated with the file.

Specifically, the data section 360 of a regular on-disk mode may include file system data or pointers, the latter referencing 4 KB data blocks on disk used to store the file system data. Each pointer is preferably a logical VBN to facilitate efficiency among the file system and the RAID system 240 when accessing the data on disks. Given the restricted size of the mode, file system data having a size that is less than or equal to 64 bytes is represented, in its entirety, within the data section of that mode. However, if the length of the contents of the data container exceeds 64 bytes but less than or equal to 64 KB, then the data section of the mode (e.g., a first level mode) comprises up to 16 pointers, each of which references a 4 KB block of data on the disk.

Moreover, if the size of the data is greater than 64 KB but less than or equal to 64 megabytes (MB), then each pointer in the data section 360 of the mode (e.g., a second level mode) references an indirect block (e.g., a first level L1 block) that contains 1024 pointers, each of which references a 4 KB data block on disk. For file system data having a size greater than 64 MB, each pointer in the data section 360 of the mode (e.g., a third level L3 mode) references a double-indirect block (e.g., a second level L2 block) that contains 1024 pointers, each referencing an indirect (e.g., a first level L1) block. The indirect block, in turn, that contains 1024 pointers, each of which references a 4 KB data block on disk. When accessing a file, each block of the file may be loaded from disk 150 into the memory 124.

When an on-disk mode (or block) is loaded from disk 150 into memory 124, its corresponding in-core structure embeds the on-disk structure. For example, the dotted line surrounding the mode 300 indicates the in-core representation of the on-disk mode structure. The in-core structure is a block of memory that stores the on-disk structure plus additional information needed to manage data in the memory (but not on disk). The additional information may include, e.g., a "dirty" bit 370. After data in the mode (or block) is updated/modified as instructed by, e.g., a write operation, the modified data is marked "dirty" using the dirty bit 370 so that the mode (block) can be subsequently "flushed" (stored) to disk. The in-core and on-disk format structures of the WAFL file system, including the modes and mode file, are disclosed and described in the previously incorporated U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

Figure 4:
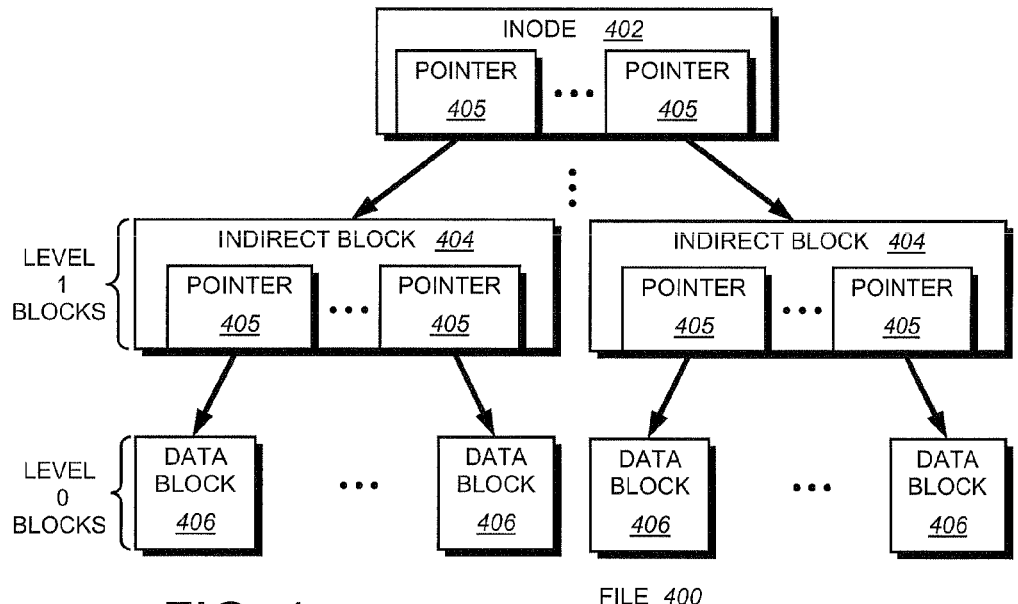
FIG. 4 is a schematic block diagram of an exemplary buffer tree in accordance with an illustrative embodiment of the present invention.

FIG. 4 is a schematic block diagram of an embodiment of a buffer tree of a file that may be advantageously used with the present invention. The buffer tree is an internal representation of blocks for a file (e.g., file 400) loaded into the memory 124 and maintained by the write-anywhere file system 360. A root (top-level) mode 402, such as an embedded mode, references indirect (e.g., level 1) blocks 404. Note that there may be additional levels of indirect blocks (e.g., level 2, level 3) depending upon the size of the file. The indirect blocks (and mode) contain pointers 405 that ultimately reference data blocks 406 used to store the actual data of the file. That is, the data of file 400 are contained in data blocks and the locations of these blocks are stored in the indirect blocks of the file. Each level 1 indirect block 404 may contain pointers to as many as 1024 data blocks. According to the "write anywhere" nature of the file system, these blocks may be located anywhere on the disks 150.

A file system layout is provided that apportions an underlying physical volume into one or more virtual volumes (or flexible volumes) of storage system 120. An example of such a file system layout is described in U.S. Pat. No. 7,409,494, issued on Aug. 5, 2008, entitled EXTENSION OF WRITE ANYWHERE FILE SYSTEM LAYOUT, by John K. Edwards et al. and assigned to NetApp, Inc. The underlying physical volume is an aggregate comprising one or more groups of disks, such as RAID groups, of the storage system. The aggregate has its own physical volume block number (PVBN) space and maintains meta-data, such as block allocation structures, within that PVBN space. Each flexible volume has its own virtual volume block number (VVBN) space and maintains meta-data, such as block allocation structures, within that VVBN space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one embodiment, PVBNs are used as block pointers within buffer trees of files (such as file 400) stored in a flexible volume. This "hybrid" flexible volume embodiment involves the insertion of only the PVBN in the parent indirect block (e.g., Mode or indirect block). On a read path of a logical volume, a "logical" volume (vol) info block has one or more pointers that reference one or more fsinfo blocks, each of which, in turn, points to an Mode file and its corresponding Mode buffer tree. The read path on a flexible volume is generally the same, following PVBNs (instead of VVBNs) to find appropriate locations of blocks; in this context, the read path (and corresponding read performance) of a flexible volume is substantially similar to that of a physical volume. Translation from PVBN-to-disk, DBN occurs at the file system/RAID system boundary of the storage operating system 200.

Figure 5:
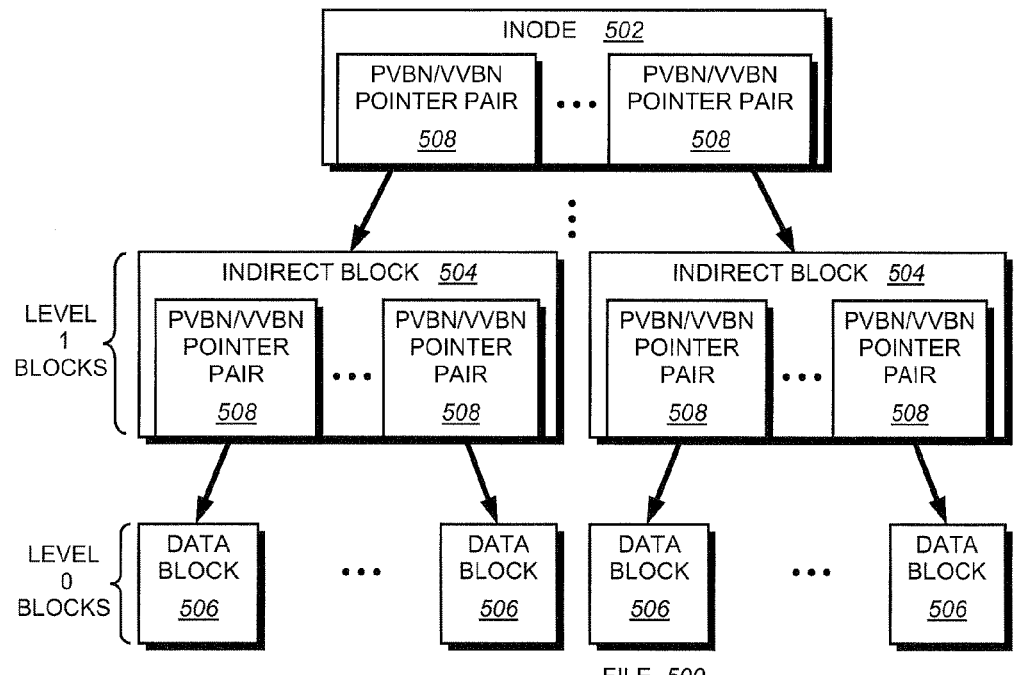
FIG. 5 is a schematic block diagram of an exemplary buffer tree in accordance with an illustrative embodiment of the present invention.

In an illustrative dual VBN hybrid flexible volume embodiment, both a PVBN and its corresponding VVBN are inserted in the parent indirect blocks in the buffer tree of a file. That is, the PVBN and VVBN are stored as a pair for each block pointer in most buffer tree structures that have pointers to other blocks, e.g., level 1(L1) indirect blocks, Mode file level 0 (L0) blocks. FIG. 5 is a schematic block diagram of an illustrative embodiment of a buffer tree of a file 500 that may be advantageously used with the present invention. A root (top-level) Mode 502, such as an embedded Mode, references indirect (e.g., level 1) blocks 504. Note that there may be additional levels of indirect blocks (e.g., level 2, level 3) depending upon the size of the file. The indirect blocks (and Mode) contain PVBN/VVBN pointer pair structures 508 that ultimately reference data blocks 506 used to store the actual data of the file.

The PVBNs reference locations on disks of the aggregate, whereas the VVBNs reference locations within files of the flexible volume. The use of PVBNs as block pointers 508 in the indirect blocks 504 provides efficiencies in the read paths, while the use of VVBN block pointers provides efficient access to required meta-data. That is, when freeing a block of a file, the parent indirect block in the file contains readily available VVBN block pointers, which avoids the latency associated with accessing an owner map to perform PVBN-to-VVBN translations; yet, on the read path, the PVBN is available.

Figure 6:
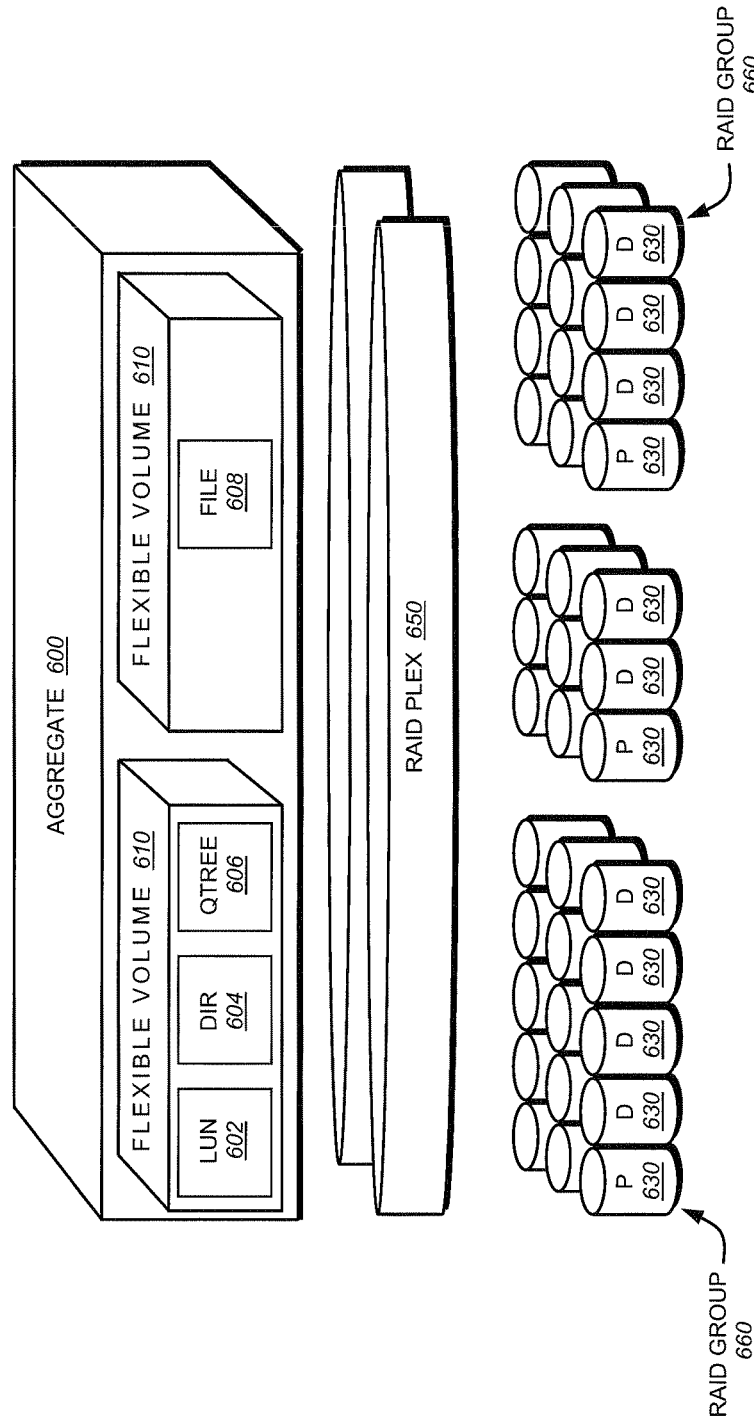
FIG. 6 is a schematic block diagram of a file system layout in accordance with an illustrative embodiment of the present invention.

FIG. 6 is a schematic block diagram of an embodiment of an aggregate 600 that may be advantageously used with the present invention. Luns (blocks) 602, directories 604, qtrees 606 and files 608 may be contained within flexible volumes 610, such as dual vbn flexible volumes, that, in turn, are contained within the aggregate 600. The aggregate 600 is illustratively layered on top of the RAID system, which is represented by at least one RAID plex 650 (depending upon whether the storage configuration is mirrored), wherein each plex 650 comprises at least one RAID group 660. Each RAID group further comprises a plurality of disks 630, e.g., one or more data (D) disks and at least one (P) parity disk. Each disk defines an address space, called a DBN space, which represents a set of disk block numbers to which content (metadata or user data) can be written.

Whereas the aggregate 600 is analogous to a physical volume of a conventional storage system, a flexible volume is analogous to a file within that physical volume. That is, the aggregate 600 may include one or more files, wherein each file contains a flexible volume 610 and wherein the sum of the storage space consumed by the flexible volumes is physically smaller than (or equal to) the size of the overall physical volume. The aggregate utilizes a PVBN space that defines a storage space of blocks provided by the disks of the physical volume, i.e., a PVBN space is formed using a collection of DBN spaces on disks contained in all raidgroups of a plex within the aggregate. Each embedded flexible volume (within a file) utilizes a VVBN space to organize those blocks, e.g., as files. Each VVBN space is an independent set of numbers that corresponds to locations within the file, which locations are then translated to PVBNs within the containing aggregate. The PVBNs, in turn, are further translated to DBNs on disk.

As noted above, for optimization reasons, references to blocks within a flexible volume can be represented both in terms of a VVBN as well as the corresponding PVBN in order to reduce the number of disk accesses required to read a given block. If such a paired-address is present, then there is no need to translate the VVBN to the PVBN as it is already known. Since the flexible volume 610 is also a logical volume, it has its own block allocation structures (e.g., active, space and summary maps) in its VVBN space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden metadata root directory that contains subdirectories of flexible volumes:

WAFL/fsid/filesystem file, storage label file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a filesystem file and a storage label file. The storage label file is illustratively a 4 KB file that contains meta-data similar to that stored in a conventional RAID label. In other words, the storage label file is the analog of a RAID label and, as such, contains information about the state of the flexible volume such as, e.g., the name of the flexible volume, a universal unique identifier (uuid) and fsid of the flexible volume, whether it is online, being created or being destroyed, etc.

Figure 7:
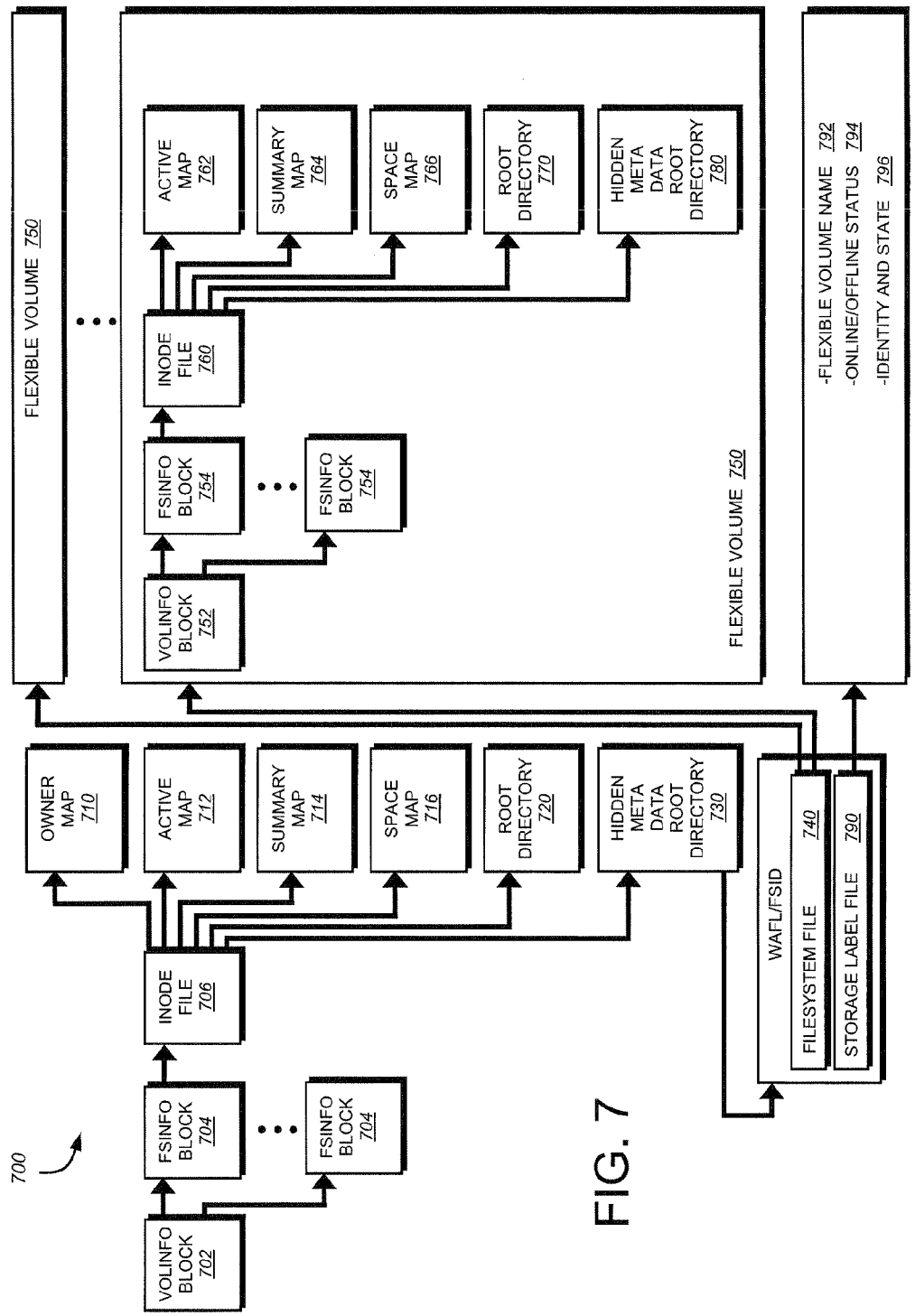
FIG. 7 is a schematic block diagram of an exemplary on-disk layout in accordance with an illustrative embodiment of the present invention.

FIG. 7 is a schematic block diagram of an on-disk representation of an aggregate 700. The storage operating system 200, e.g., the RAID system 240, assembles a physical volume of PVBNs to create the aggregate 700, with PVBNs 1 and 2 comprising a "physical" volinfo block 702 for the aggregate. The volinfo block 702 contains block pointers to fsinfo blocks 704, each of which may represent a snapshot of the aggregate. Each fsinfo block 704 includes a block pointer to an mode file 706 that contains modes of a plurality of files, including an owner map 710, an active map 712, a summary map 714 and a space map 716, as well as other special meta-data files. The mode file 706 further includes a root directory 720 and a "hidden" meta-data root directory 730, the latter of which includes a namespace having files related to a flexible volume in which users cannot "see" the files. The hidden meta-data root directory includes the WAFL/fsid/directory structure that contains filesystem file 740 and storage label file 790. Note that root directory 720 in the aggregate is empty; all files related to the aggregate are organized within the hidden metadata root directory 730.

In addition to being embodied as a container file having level 1 blocks organized as a container map, the file system file 740 includes block pointers that reference various file systems embodied as flexible volumes 750. The aggregate 700 maintains these flexible volumes 750 at special reserved mode numbers. Each flexible volume 750 also has special reserved mode numbers within its flexible volume space that are used for, among other things, the block allocation bitmap structures. As noted, the block allocation bitmap structures, e.g., active map 762, summary map 764 and space map 766, are located in each flexible volume.

Specifically, each flexible volume 750 has the same mode file structure/content as the aggregate, with the exception that there is no owner map and no WAFL/fsid/filesystem file, storage label file directory structure in a hidden meta-data root directory 780. To that end, each flexible volume 750 has a volinfo block 752 that points to one or more fsinfo blocks 754, each of which may represent a snapshot, along with the active file system of the flexible volume. Each fsinfo block, in turn, points to an mode file 760 that, as noted, has the same mode structure/content as the aggregate with the exceptions noted above. Each flexible volume 750 has its own mode file 760 and distinct mode space with corresponding mode numbers, as well as its own root (fsid) directory 770 and subdirectories of files that can be exported separately from other flexible volumes.

The storage label file 790 contained within the hidden meta-data root directory 730 of the aggregate is a small file that functions as an analog to a conventional RAID label. A RAID label includes physical information about the storage system, such as the volume name; that information is loaded into the storage label file 790. Illustratively, the storage label file 790 includes the name 792 of the associated flexible volume 750, the online/offline status 794 of the flexible volume, and other identity and state information 796 of the associated flexible volume (whether it is in the process of being created or destroyed).

D. VBN to DBN Mapping

The present invention provides a system and method for volume block number (VBN) to disk block number (DBN) mapping that may be utilized for both single and/or multiple parity based redundancy systems. Illustratively one of a plurality of parity distribution techniques is utilized to determine a new parity layout of a disk array organized into one or more Redundant Array of Inexpensive Disk (RAID) groups as the result of adding disks to a RAID group. Following parity (re)distribution, new VBNs are assigned to DBNs in the newly added disk and DBNs on older drives which stored parity blocks that were relocated to the new disk. By utilizing the programmatic assignment of VBNs, the present invention obviates the need to use persistently stored mapping/translation tables for each VBN/DBN relationship. In an illustrative embodiment of the present invention, flexible volumes stored within aggregates are utilized. In such embodiments, a physical volume block number (PVBN) may be utilized in place of a VBN. As such, the terms PVBNs and VBNs may be used interchangeably in describing the present invention.

The present invention permits the calculation of a PVBN value that is identified by a given DBN by first computing a table relative PVBN and identifying a logical disk number. The start (i.e., PVBN value of the first block) of the PVBN range, corresponding to the logical disk number, containing the desired PVBN is identified and the PVBN value is computed by adding a striped value to the start of the identified PVBN range.

Similarly, given a PVBN, the corresponding DBN may be identified by first computing a logical disk number for the PVBN and then computing a stripe by, e.g., subtracting a start of a PVBN range from the given PVBN. The PVBN is then converted to a table relative PVBN and the disk that stores the DBN is identified. The DBN on the identified disk is then identified as the block represented by the computed stripe on the identified disk. More generally, the present invention enables improved VBN-DBN mapping functionality to improve system performance and to enable dynamic disk additions to disk arrays utilizing distributed parity.

The present invention enables seamless parity block reallocations due to, e.g., a disk addition. The present invention also ensures that the arrangement of VBNs is computed in a manner such that the set of VBNs within a stripe is the same as the set which would be formed when using a dedicated parity organization, e.g., RAID 4. This holds true both with the initial organization at the moment a raidgroup is created as well as subsequent to expansion via disk additions. This property ensures that the filesystem can be oblivious to the placement of parity blocks and/or the redundancy level (e.g., single or double parity) of the underlying RAID array and can treat both RAID 4 and distributed parity organization in an identical manner. This greatly simplifies filesystem design and also provides a great deal of flexibility in configuring the underlying RAID array. Furthermore, by obviating the need for a static mapping table, the present invention gives greater flexibility for disk topology aware file systems.

Figure 8:
FIG. 8 is a schematic block diagram of a mapping data structure in accordance with an illustrative embodiment of the present invention.

FIG. 8 is a schematic block diagram of an exemplary mapping data structure 800 in accordance with an illustrative embodiment of the present invention. The mapping data structure 800 is utilized by the RAID module 240 for tracking information for implementing the VBN-DBN mapping of the present invention. The data structure 800 is illustratively embodied as a table, but may embody any data structure configured to describe a pattern used for mapping VBNs to DBNs for a given RAID group. In the illustrative embodiment, the RAID module maintains a mapping data structure 800 for each RAID group serviced by the RAID module. However, in an alternative embodiment of the present invention, the RAID module may maintain one mapping data structure 800 that is used system wide. Such a system wide mapping data structure 800 may be sized for the maximum sized RAID group possible, with each RAID group only using a subset of the mapping structure so defined. The mapping data structure 800 includes a number of parity blocks per stripe field 805, an initial size field 810, a number of disks field 815, a chunk size field 820, a repeat interval field 825, a reference count field 830, a map array field 835 and, in alternative embodiments, additional fields 840.

The number of parity blocks per stripe field 805 identifies the number of parity block within a stripe of a given RAID group. For example, in a double parity system, there are two parity blocks per stripe. The initial size field 810 describes a number of disks with which the RAID group was initially created. The contents of the initial size field 810 are utilized to seed the VBN storage space with a predefined parity pattern in accordance with an illustrative embodiment of the present invention. The number of disks field 815 identifies the current number of disks within the RAID group. By examining the contents of the initial size field 810 and the number of disks field 815, the disk storage module 240 may identify the current size of the RAID group as well as the number of disks that were added to the group after it was originally created. As disks are added to the RAID group, the number of disks field 815 is increased. The initial size field 810 and the number of disks field 815 enable the RAID module to determine the current VBN assignments using the programmatic technique of the present invention. The chunk size field 820 identifies the number of blocks, e.g., of 4 KB in size, mapped to by each table relative VBN stored within the mapping data structure 800. The repeat interval field 825 identifies a number of chunks at which the VBN-DBN mapping pattern and parity distribution repeat for a RAID group having a number of disks equal to that identified in field 815 with the number of disks defined in the initial size field 810. The reference count field 830 tracks number of the references to this mapping data structure 800. The reference count field 830 may be increased due to, e.g., an additional RAID group utilizing the mapping data structure 800. The map array 835 is a two-dimensional array describing the distribution pattern of VBNs relative to the size of the table and parity blocks across disks within the RAID group. The two-dimensional array 835 represents a contiguous VBN space relative to the repeat interval and the RAID group size.

Figure 9:
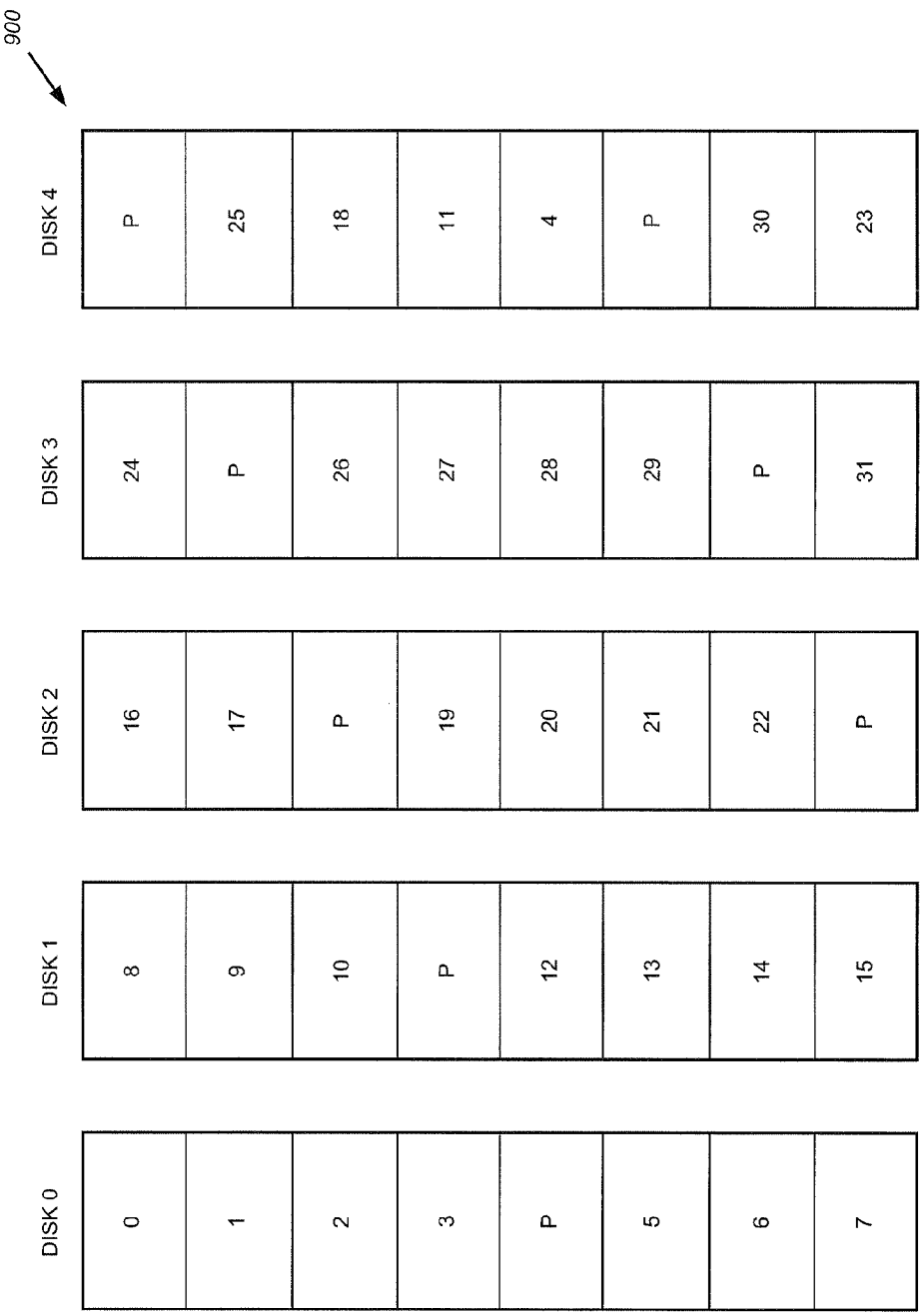
FIG. 9 is a schematic block diagram illustrating VBN allocation in a single parity environment in accordance with an illustrative embodiment of the present invention.

FIG. 9 is a schematic block diagram of an exemplary assignment of VBNs to disks of an array 900 in accordance with an illustrative embodiment of the present invention. In the example, five disks of the disk array 900 are organized as a RAID group (disks 0-4) containing a single parity block in each stripe. As will be appreciated, the present invention may be utilized with any sized RAID groups. As such, the description of a five disk RAID group should be taken as exemplary only. In accordance with an illustrative parity assignment algorithm, a segment of VBN values begin at an initial data block of a disk and continue until a block that is to contain parity is reached. When a block that is to contain parity is reached, the VBN value that would have been assigned to the particular block is instead assigned to a correspondingly-positioned block on the same stripe in a last disk of the RAID group, i.e. disk 4 of the array. Thus, for example, on disk 0 of the array 900, VBN values 0, 1, 2, 3 are assigned to the first four data blocks. However the fifth block of the disk, which would have been assigned VBN 4, is occupied by parity (P). As such, VBN 4 is assigned to a correspondingly-positioned block, e.g., the fifth block, located on disk 4, i.e. the last disk of the RAID group. The assignment algorithm continues with VBN values 5, 6 and 7 assigned to the last three data blocks as well as VBN values 8, 9 and 10 on the next disk (disk 1). Since the next block (i.e., the fourth block) on disk 1 is occupied by parity, the VBN value that would have been assigned to that block (e.g., VBN 11) is instead assigned to the correspondingly-positioned block on disk 4. This illustrative assignment algorithm continues until all VBNs are appropriately assigned. As can be seen by the illustrative assignment algorithm, the set of VBNs within any given stripe is the same as the VBNs which would be assigned if the raidgroup, instead, was configured to use a dedicated parity organization, e.g., RAID 4. One of the objectives of assigning VBNs in this manner is to attempt to create long contiguous sequences of VBNs which are also physically contiguous on disk. The placement of parity blocks may be determined by a specific parity distribution technique. In this example, the distribution of parity blocks follows a left-symmetric pattern. However, any other distribution which spreads parity blocks uniformly across the disks of a raidgroup can be employed. Thus, for example, the placement of parity will differ between a RAID 5 implementation and a RAID-DP implementation.

Figure 10:
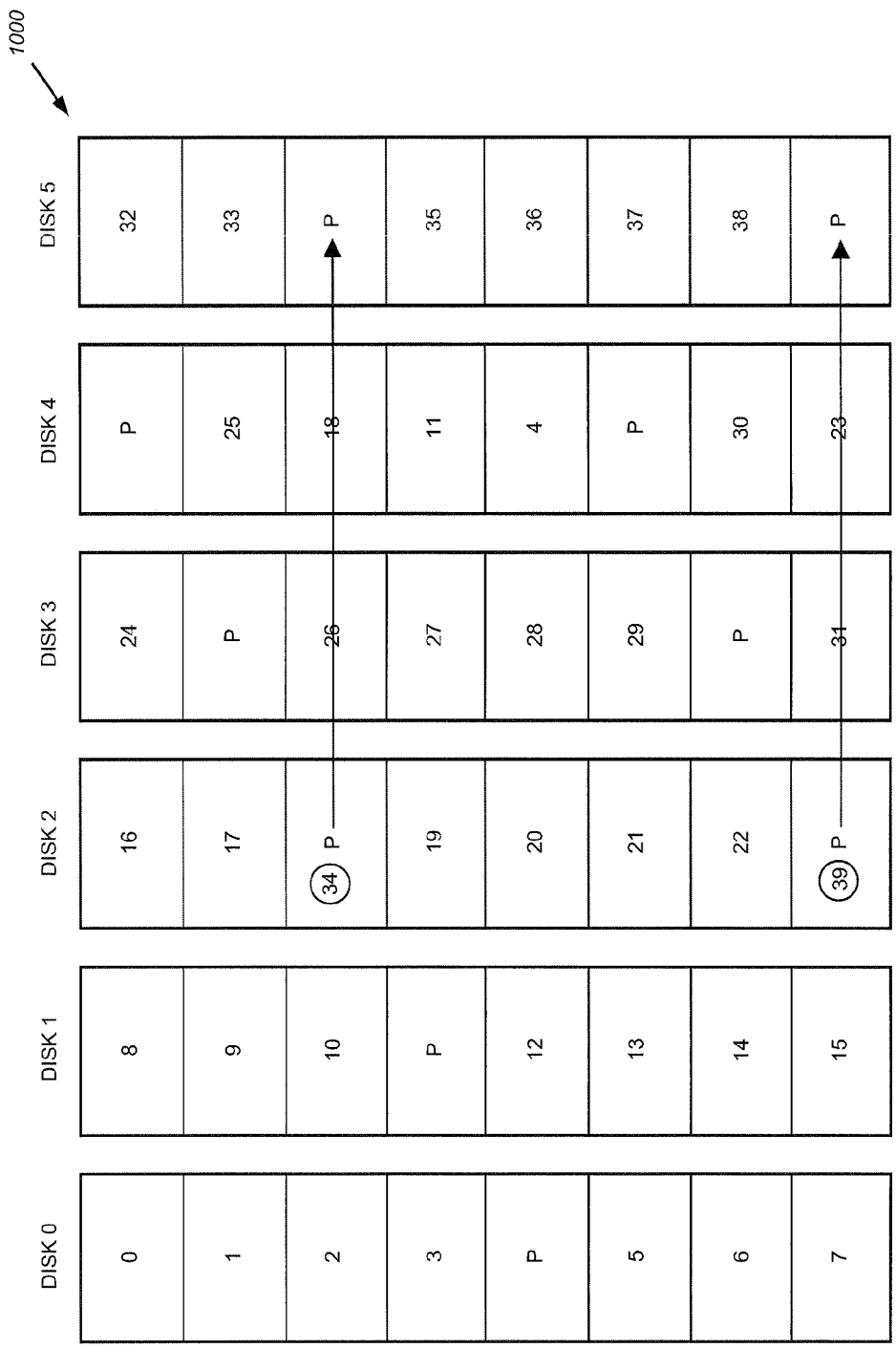
FIG. 10 is a schematic block diagram illustrating VBN relocation in response to a disk addition in accordance with an illustrative embodiment of the present invention.

FIG. 10 is a schematic block diagram illustrating an exemplary re-assignment of VBNs to disks of an array 1000 as a result of a disk addition in accordance with an illustrative embodiment of the present invention. In the example shown, a sixth disk (disk 5) has been added to the array 900 of FIG. 9 to thereby form array 1000. In illustrative array 1000, a parity (re)-balancing algorithm has determined that some parity blocks should be moved to the newly added disk, e.g., in the third block position on the newly added disk 5, as well as the eighth block position on disk 5. Thus, in the example the first block on disk 5 is assigned a VBN value 32 and the algorithm continues assigning VBN values to the remaining blocks on disk 5, e.g., up to VBN 39. In addition, parity initially assigned to blocks of a disk previously present in the RAID group (for example, disk 2), is relocated to correspondingly-positioned blocks on disk 5. Illustratively, in operation, the parity (re)-balancing algorithm is first applied and the parity blocks that have been moved to the newly added disks are identified. The DBN locations earlier occupied by the moved parity blocks are now unassigned. Then VBN assignment begins, where VBNs are sequentially assigned to blocks on the newly added disk. When a parity block is encountered on the newly added disk, the DBN occupied on its original disk, (i.e., prior to the disk addition) is assigned the next VBN. It should be noted that when a parity block is moved, no copy operation occurs. Instead, the destination block is treated as parity. As new disks are pre-zeroed prior to addition to a raidgroup, no change to parity within a stripe occurs. In accordance with an illustrative embodiment of the present invention, a plurality of differing parity assignment algorithms may be utilized. As such, the example described herein should be taken as exemplary only.

Figure 11:
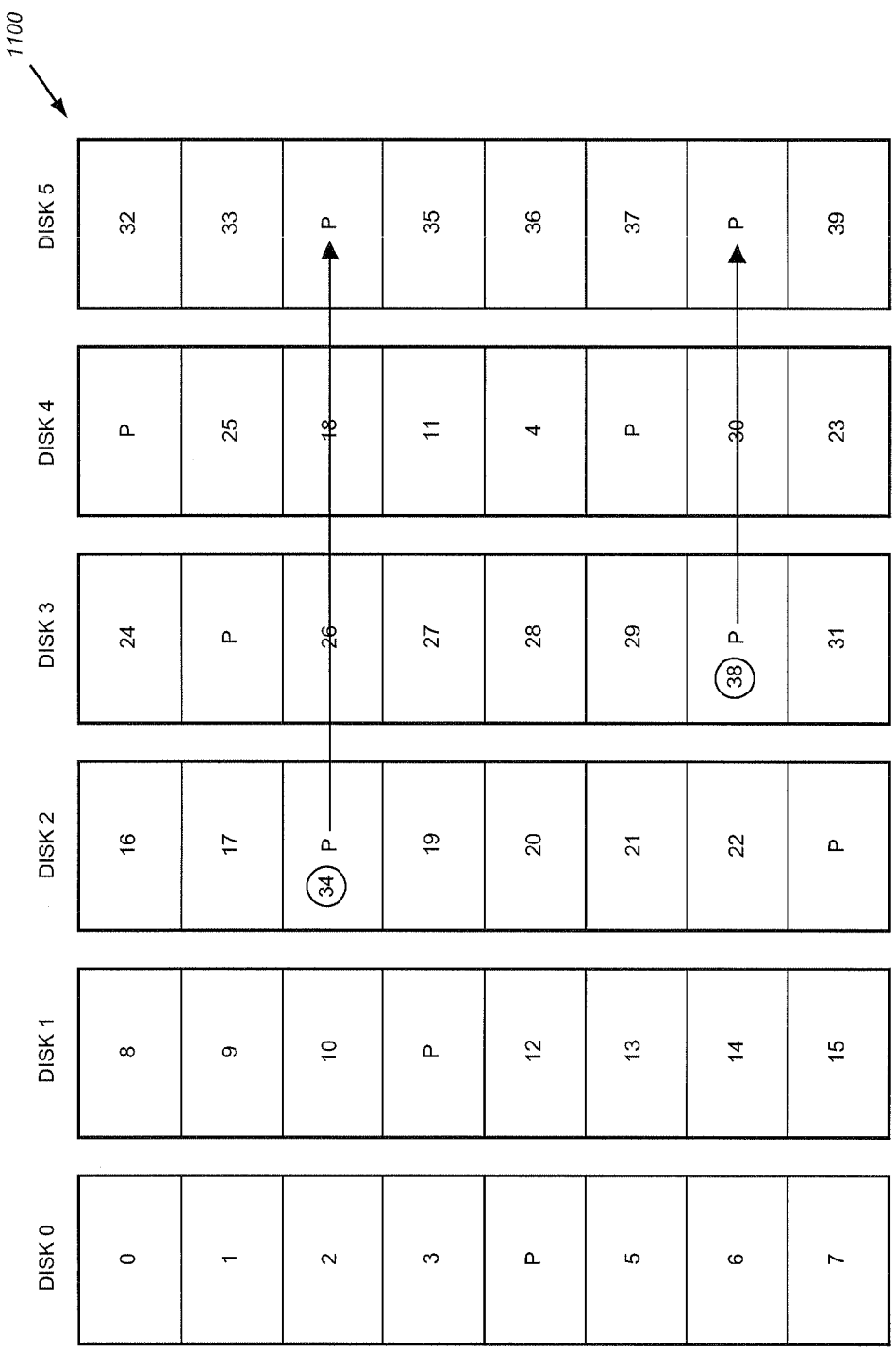
FIG. 11 is a schematic block diagram illustrating VBN relocation in response to a disk addition in accordance with an illustrative embodiment of the present invention.

FIG. 11 is a schematic block diagram illustrating an exemplary re-assignment of VBNs to disks of an array 1100 as a result of a disk addition in accordance with an illustrative embodiment of the present invention. Similar to FIG. 10, a sixth disk (disk 5) has been added to the array 900 of FIG. 9 to thereby form array 1100. In distinction with array 1000, parity blocks are moved from two different disks (disks 2 and 3) to disk 5. For example, a parity (P) block on disk 2 is moved to disk 5, thereby causing VBN 34 to be assigned to disk 2. Similarly, a parity block from disk 3 is moved to disk 5.

Figure 12:
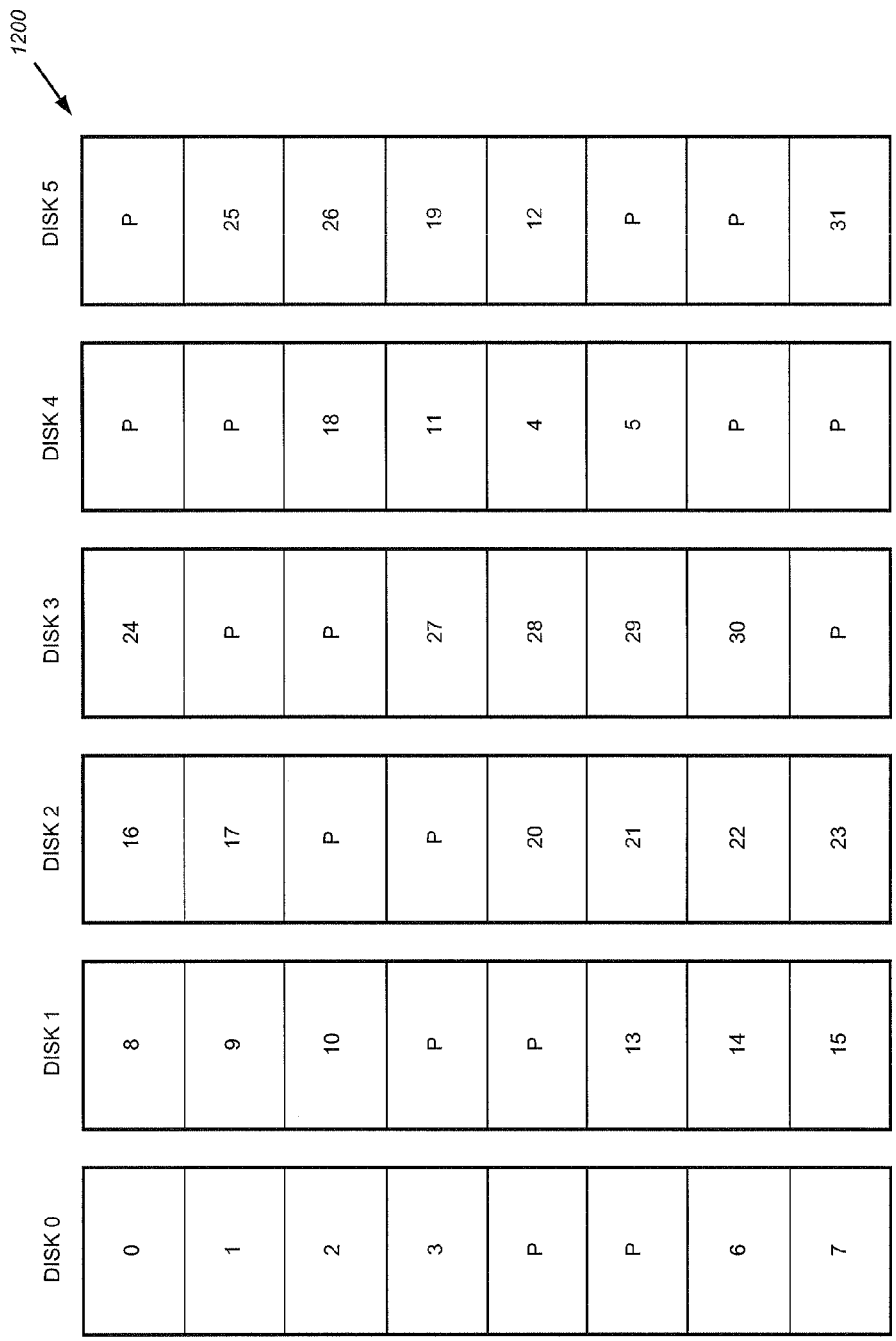
FIG. 12 is a schematic block diagram illustrating VBN assignment in a double parity environment in accordance with an illustrative embodiment of the present invention.

FIG. 12 is a schematic block diagram illustrating an illustrative assignment of VBNs in a double parity array 1200 in accordance with an illustrative embodiment of the present invention. In the exemplary double parity array, VBNs are assigned to data blocks of a given disk until the assigned VBNs reach a block in which parity is to be stored. Once a block is reached in which parity is to be stored, the next VBN is assigned to the second to last disk of the array, e.g., a RAID group. Thus, for example, VBN 4 is assigned to a fifth block of disk 4 as parity is stored in a correspondingly positioned block on disk 0. If a VBN has previously been assigned to the block on the second to last disk, then the VBN is instead assigned to the correspondingly positioned block on the last disk. Thus, for example, the second parity block on the fourth stripe, initially would have been assigned a VBN value of 19, but because it occupies parity, an attempt was made to assign VBN 19 to a correspondingly positioned block on disk 4. However, because VBN 11 had been assigned to that block on disk 4, VBN 19 is assigned to a correspondingly positioned block on disk 5.

It should be noted that in alternative embodiments of the present invention, VBN assignments may be made at a chunk granularity, where a chunk represents a physically contiguous series of blocks. In such cases, VBNs within a chunk are numbered sequentially. In these alternative embodiments, the term "block" may be replaced with the term "chunk" in the descriptions of FIGS. 9-12 above.

Figure 13:
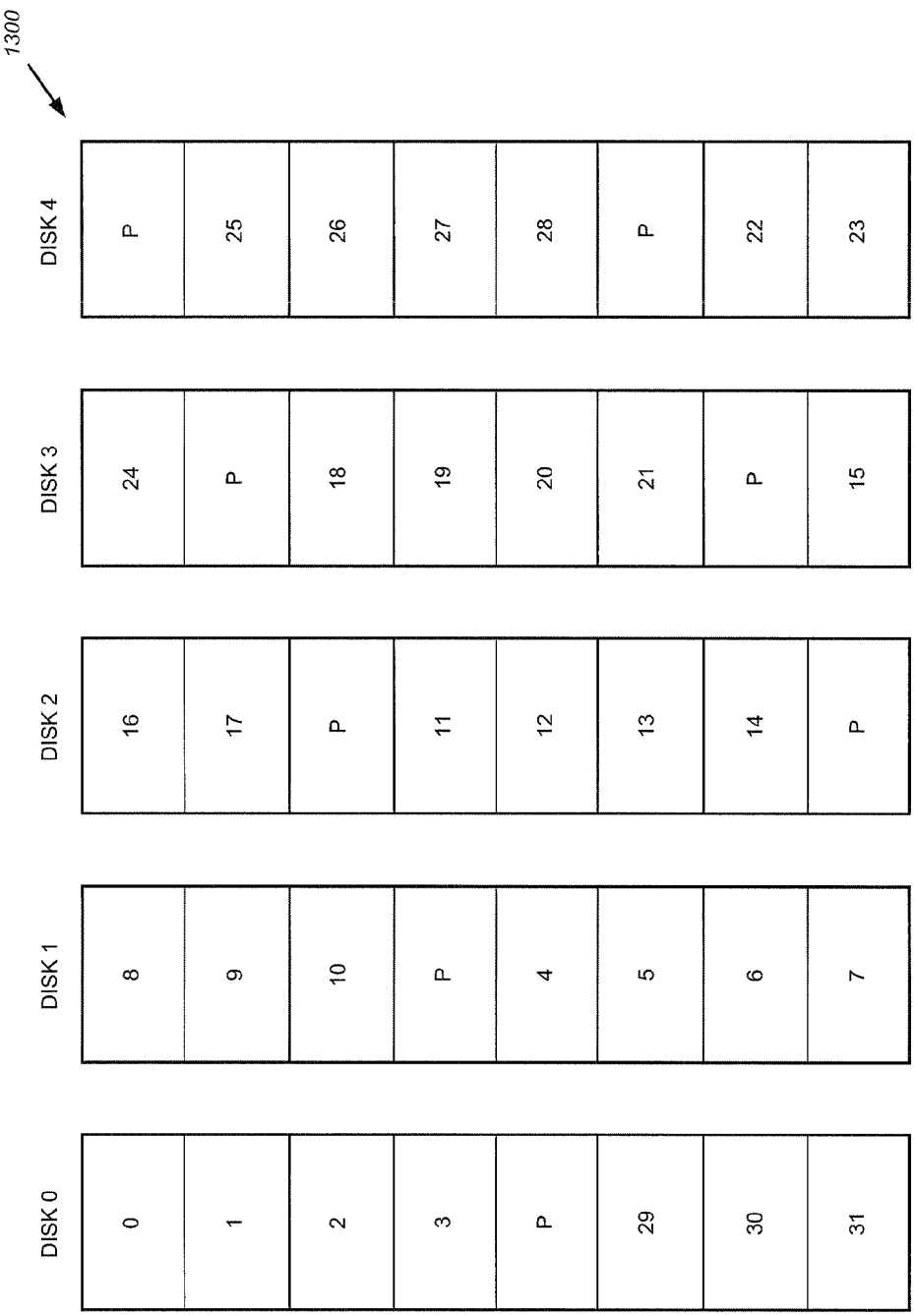
FIG. 13 is a schematic block diagram illustrating VBN assignment in accordance with an illustrative embodiment of the present invention.

FIG. 13 is a schematic block diagram illustrating an assignment of VBNs to disks of an array 1300 in accordance with an illustrative embodiment of the present invention. In the illustrative array 1300, VBNs are sequentially assigned to data blocks on a given disk until a parity block is reached. Once a parity block is reached, the VBN that would be assigned to that block is instead assigned to the correspondingly positioned block on the next disk of the array. Thus, VBN value 4 is assigned to the fifth block on disk 1 as the fifth block on disk 0 is a parity block. Sequential assignment of VBNs continues with the next disk, e.g., VBN value 5 is assigned to the next block location on disk 1, until the next parity block is reached at which time the next VBN value is assigned to the next disk. In accordance with the illustrative embodiment, in an array of n disks (disks 0 to n−1), when a parity block is reached on disk n−1, the process continues by allocation, the next VBN valued on disk 0. It should be noted that the above described illustrative embodiments are exemplary. In accordance with other alternative embodiments, VBNs may be allocated using different algorithmic techniques.

This process of VBN assignment represents an alternative embodiment to that described above in reference to FIG. 9 for assigning VBNs such that long chains of physically contiguous VBNs are formed. Long chains of physically contiguous VBNs permit abstracting the VBN space as a set of ranges wherein each range corresponds to the size of a disk. Advantageously, this permits the file system to treat each VBN range as corresponding to a logical disk and operate on it in a manner similar to a physical disk. Long chains ensure that this is possible while guaranteeing that the impact on read throughput is negligible.

FIG. 14 is a schematic block diagram of a mapping table 1400 in accordance with an illustrative embodiment of the present invention. As will be appreciated y one skilled in the art, the mapping table 1400 represents a two dimensional table that may be utilized for performing VBN to DBN mappings.

FIG. 15 is a schematic block diagram illustrating an exemplary 5 disk RAID array that stores two repetitions of mapping table 1400. The RAID array 1500 illustrates the pattern of VBN assignments assuming RAID groups where the number of the stripes is given by the repeat interval defined in field 825. The size of the RAID group is represented by size field 815 with the initial number of disks defined in field 810. As will be appreciated from FIGS. 14 and 15, in a RAID group, the pattern of parity blocks and VBNs (as shown in FIG. 14) is repeated along the length of the disks as shown in FIG. 15.

Figure 16:
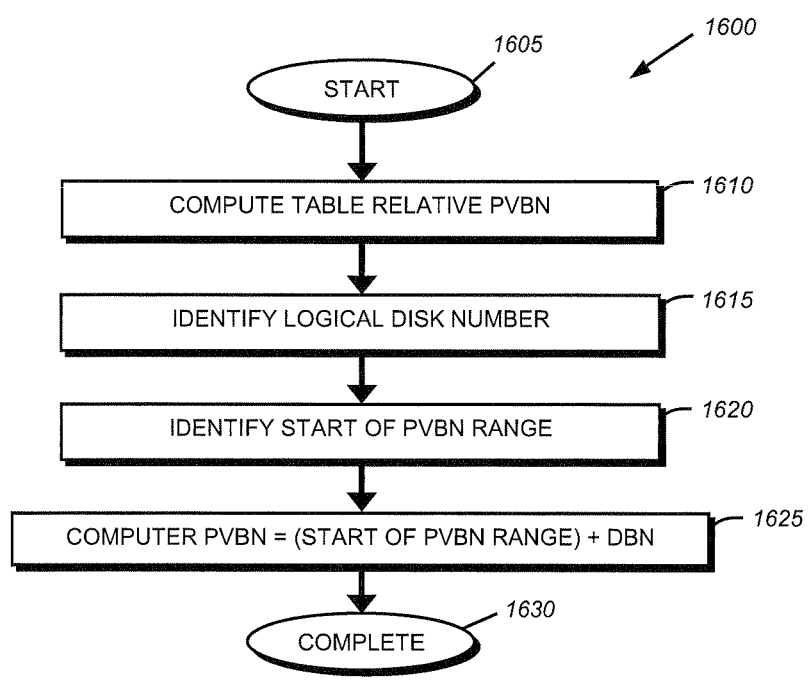
FIG. 16 is a flowchart detailing the steps of a procedure for determining a VBN given a particular DBN in accordance with an illustrative embodiment of the present invention.

FIG. 16 is a flowchart detailing the steps of a procedure 1600 for computing a VBN from a given DBN in accordance with an illustrative embodiment of the present invention. Procedure 1600 may be utilized to, e.g., identify the VBN mapped to a given DBN. Illustratively, procedure 1600 may be utilized by the RAID module to perform VBN to DBN mapping while processing data access requests. The procedure 1600 begins in step 1605 and continues to step 1610 where a table relative VBN is first computed. The table relative VBN is illustratively identified by indexing into the map array 835 of mapping data structure 800. In accordance with an illustrative embodiment, the table relative VBN is located by indexing into the map using the stripe and the disk number of the array as indices. The stripe number is computed by first dividing the DBN with the chunk size 820 and then computing the module repeat interval 825 from the result. This process results in the stripe number within the two-dimensional array of the chunk within which the DBN is contained. The VBN contained within the entry within the two-dimensional array corresponding to the stripe (as computed above) and using the disk number as an index representing the table relative VBN. In step 1615, the logical disk number is identified. The logical disk number is illustratively computed by dividing the table relative VBN by the repeat interval. The start (i.e., VBN value of the first block) of the VBN range is then identified in step 1620. By utilizing the VBN range index data structure 285, the logical disk number is mapped to a VBN range on the actual RAID group. In step 1625 the VBN is computed by adding the stripe value (the DBN value) to the starting VBN value of the range of VBNs. The procedure completes in step 1630.

Figure 17:
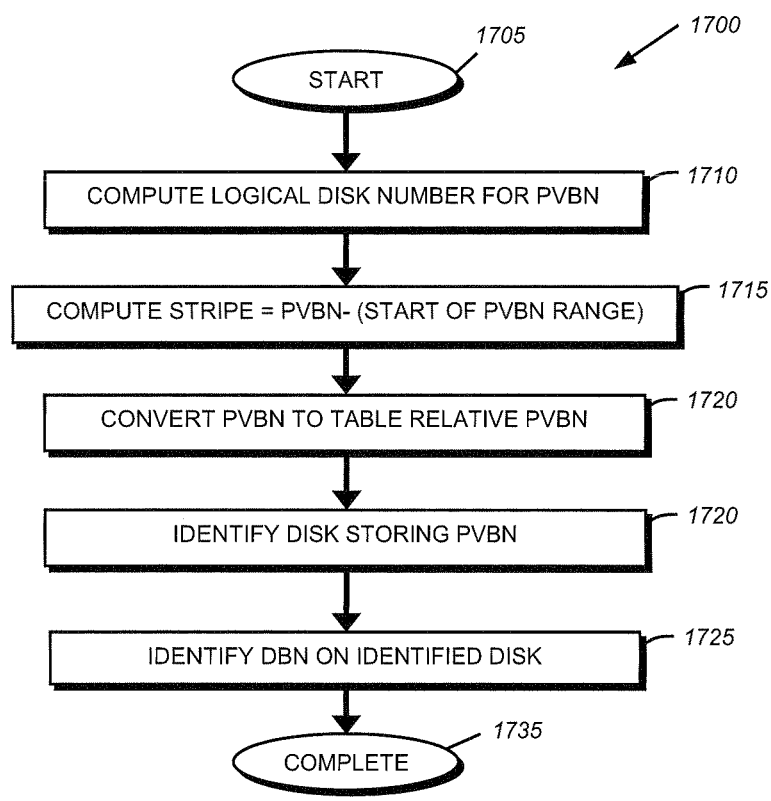
FIG. 17 is a flowchart detailing the steps of a procedure for determining a DBN given a particular VBN in accordance with an illustrative embodiment of the present invention.

FIG. 17 is a flowchart detailing the steps of a procedure 1700 for a computing a DBN given a VBN in accordance with an illustrative embodiment of the present invention. The procedure 1700 begins in step 1705 and continues to step 1710 where the logical disk number for the VBN is computed. The logical disk number is illustratively computed by, e.g., locating the VBN in the VBN range list 280. The logical disk number is the disk identified as hosting the VBN range containing the desired VBN. In step 1715 the stripe is computed. The stripe is illustratively computed by subtracting the value of the start of the VBN range from the given VBN value. The VBN is then converted to a table relative VBN in step 1720. Illustratively, the table relative VBN is computed by multiplying the logical disk number by the repeat interval and then adding the table stripe value. The table stripe value is computed by, e.g., taking a chunk value modulo the repeat interval, where the chunk value equals the stripe divided by the chunk size. The disk storing the VBN is identified in step 1725 by searching the two-dimensional array for an entry corresponding to the "table relative VBN." This search need only be done for entries in the two-dimensional array corresponding to the table stripe. The disk storing the VBN corresponds to the index of the column containing the table relative VBN. The raidmap index structure 290 can now be used to point to the actual physical disk. The DBN on the identified disk is then identified in step 1730. Illustratively, the DBN comprises the block representing the computed stripe on the identified disk. The procedure completes in step 1735.

The foregoing description has been directed to specific embodiments of this invention. Additionally, the procedures, processes and/or modules described herein may be implemented in hardware, software, embodied as a computer-readable medium having program instructions, firmware, or a combination thereof. Furthermore, it should be noted that the terms PVBN and VBN may be utilized interchangeably herein depending on the type of volume being utilized. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for mapping a volume block number to a disk block number in a storage system, the method comprising:
computing a table relative volume block number for the disk block number of a storage device of a storage device array implementing a redundancy technique, wherein the table relative volume block number is an entry in a two-dimensional mapping data structure, wherein a disk number of the storage device corresponds to an index of a first dimension of the two-dimensional mapping data structure, wherein a chunk is computed by dividing the disk block number by a chunk size, wherein a table stripe value is computed by taking the chunk modulo a repeat interval, wherein the table relative volume block number is identified by indexing into the two-dimensional mapping data structure using the table stripe value as an index of a second dimension of the two-dimensional mapping data structure and the disk number as the index of the first dimension, and wherein the two-dimensional mapping data structure is created using an initial number of disks field and a current number of disks field;
identifying a logical disk number using the table relative volume block number;
identifying a start of a volume block number range;
computing a volume block number associated with the disk block number of the storage device; and
maintaining the two-dimensional mapping data structure by excluding parity blocks from a volume block number space.

2. The method of claim 1 wherein the volume block number comprises a physical volume block number.

3. The method of claim 1 wherein computing the volume block number associated with the disk block number further comprises computing the volume block number by adding the disk block number to the start of the volume block number range.

4. The method of claim 3 further comprising identifying the start of the volume block number range by mapping the logical disk number into a range index.

5. The method of claim 1 further comprising passing the computed volume block number to a file system of the storage system for use in processing a data access request.

6. The method of claim 1, further comprising
creating the two-dimensional mapping data structure, whereby a static table is not required.

7. The method of claim 1, wherein the table relative volume block number and the volume block number are within the volume block number space.

8. The method of claim 1 wherein the two-dimensional mapping data structure is created further using a two-dimensional array describing a distribution pattern of volume block numbers relative to a size of the two-dimensional mapping data structure.

9. A method for mapping a disk block number to a volume block number in a storage device array of a storage system, the method comprising:
   computing a logical disk number for the volume block number;
   computing a stripe value;
   converting the volume block number to a table relative volume block number, wherein the table relative volume block number is an entry in a two-dimensional mapping data structure, wherein a disk number corresponds to an index of a first dimension of the two-dimensional mapping data structure, and wherein the two-dimensional mapping data structure is created using an initial number of disks field and a current number of disks field;
   identifying a disk storing the volume block number by indexing into the two-dimensional mapping data structure using the computed stripe value as an index of a second dimension of the two-dimensional mapping data structure; and
   identifying the disk block number on the identified disk of the array.

10. The method of claim 9 wherein computing the logical disk number for the volume block number further comprises indexing into a volume block range list to identify the logical disk number.

11. The method of claim 9 wherein computing the stripe value further comprises subtracting a start of a volume block number range from the volume block number.

12. The method of claim 9 wherein the volume block number comprises a physical volume block number.

13. The method of claim 9 wherein converting the volume block number to the table relative volume block number further comprises:
   computing a chunk value by dividing the stripe value by a chunk size;
   computing a table stripe value by taking the chunk modulo a repeat interval; and
   computing the table relative volume block number using the computed table stripe value.

14. The method of claim 9 wherein identifying the disk block number on the identified disk further comprises identifying a block represented by the stripe value on the identified disk.

15. A non-transitory computer readable medium for mapping a volume block number to a disk block number in a storage device array of a storage system, the computer readable medium comprising program instructions that:
   compute a table relative volume block number for the disk block number in a storage device of the array, wherein the table relative volume block number is an entry in a two-dimensional mapping data structure, wherein a disk number corresponds to an index of a first dimension of the two-dimensional mapping data structure, wherein a chunk is computed by dividing the disk block number by a chunk size, wherein a table stripe value is computed by taking the chunk modulo a repeat interval, wherein the table relative volume block number is identified by indexing into the two-dimensional mapping data structure using the table stripe value as an index of a second dimension of the two-dimensional mapping data structure and the disk number as the index of the first dimension, and wherein the two-dimensional mapping data structure is created using an initial number of disks field and a current number of disks field;
   identify a logical disk number using the table relative volume block number;
   identifying a start of a volume block number range;
   computing a volume block number associated with the disk block number in the storage device; and
   maintaining the two-dimensional mapping data structure by excluding parity blocks from a volume block number space.

16. The non-transitory computer readable medium of claim 15, further comprising:
   program instructions that create the two-dimensional mapping data structure, whereby a static table is not required.

17. A non-transitory computer readable medium for mapping a disk block number to a volume block number in a storage device array of a storage system, the computer readable medium including program instructions for:
   computing a logical disk number for the volume block number, wherein the logical disk associated with the volume block number corresponds to a first index of a row of a two-dimensional mapping data structure, wherein a disk number corresponds to a second index of a column of the two-dimensional mapping data structure, and wherein the two-dimensional mapping data structure is dynamically created using a initial number of disks field and a current number of disks field;
   computing a stripe value;
   converting the volume block number to a table relative volume block number;
   identifying a disk storing the volume block number by indexing into the two-dimensional mapping data structure using the computed stripe value as an index of a second dimension of the two-dimensional mapping data structure; and
   identifying the disk block number on the identified disk of the array; and
   maintaining the two-dimensional mapping data structure by excluding parity blocks from a volume block number space.

18. A system for maintaining a mapping between disk block numbers and volume block numbers, the system comprising:
   a storage system executing a storage operating system, the storage operating system including a disk topology aware file system operatively interconnected with a disk storage module configured to export a volume block number space, wherein the disk storage module is further configured to provide volume block number to disk block number mappings using an algorithmic mapping technique, whereby a static mapping table is not required;

a two-dimensional mapping data structure describing a distribution pattern of volume block numbers, wherein a disk number corresponds to an index of a column of the two-dimensional mapping data structure, wherein a chunk is computed by dividing the disk block number by a chunk size, wherein a table stripe value is computed by taking the chunk modulo a repeat interval, wherein a is identified by indexing into the two-dimensional mapping data structure using the disk number as the index of the column and the table stripe value as an index of a row of the two-dimensional mapping data structure, and wherein the two-dimensional mapping data structure is dynamically created using a number of disks field and a current number of disks field; and maintaining the two-dimensional mapping data structure by excluding parity blocks from a volume block number space.

19. The system of claim 18 wherein the disk storage module implements a parity protection technique on a set of storage devices operatively interconnected with the storage system.

20. The system of claim 18 wherein the disk storage module comprises a volume block number range data structure and a volume block number range index data structure.

21. A system comprising:
a storage system executing a storage operating system, the storage operating system configured to:
compute a table relative volume block number for a disk block number of a storage device of a storage device array implementing a redundancy technique, wherein the table relative volume block number is an entry in a two-dimensional mapping data structure, and wherein a disk number of the storage device corresponds to an index of a column of the two-dimensional mapping data structure, wherein a chunk is computed by dividing the disk block number by a chunk size, wherein a table stripe value is computed by taking the chunk modulo a repeat interval, wherein the table relative volume block number is identified by indexing into the two-dimensional mapping data structure using the disk number as the index of the column and the table stripe value as an index of a row of the two-dimensional mapping data structure, and wherein the two-dimensional mapping data structure is dynamically created using a initial number of disks field and a current number of disks field;
identify a logical disk number using the table relative volume block;
identify a start of a volume block number range;

compute a volume block number associated with the disk block number in the storage device; and
maintaining the two-dimensional mapping data structure by excluding parity blocks from a volume block number space.

22. The system of claim 21 wherein the storage operating system is further configured to exclude parity blocks from a volume block number space.

23. A method for mapping a volume block number space when adding a disk to a set of previous disks of a storage array implementing a redundancy technique, the method comprising:

assigning a new volume block number to a disk block number of a previous disk in the set of previous disks when encountering a parity block on the added disk, wherein the disk block number of the previous disk corresponds to the parity block;

maintaining a two-dimensional mapping data structure, the two-dimensional mapping data structure including a plurality of table relative volume block numbers, wherein a new table relative volume block number is calculated from the disk block number and a disk number of the previous disk, wherein the disk number corresponds to an index of a column of the two-dimensional mapping data structure, wherein the new table relative volume block number and the volume block number are within the volume block number space, wherein a chunk is computed by dividing the disk block number of the previous disk by a chunk size, wherein a table stripe value is computed by taking the chunk modulo a repeat interval, wherein each of the plurality of table relative volume block numbers is identified by indexing into the two-dimensional mapping data structure using the table stripe value as an index of a row of the two-dimensional mapping data structure and the disk number as the index of the column, and wherein the two-dimensional mapping data structure is dynamically created using a persistently stored initial number of disks field and a persistently stored current number of disks field;

storing the new table relative volume block number in the two-dimensional mapping data structure, wherein a static table is not required to convert a disk block on the previous disk to a data block; and maintaining the two-dimensional mapping data structure by excluding parity blocks from a volume block number space.

24. The method of claim 23, further comprising:
writing data of the parity block to the added disk.

* * * * *

UNITED STATES PATENT AND TRADEMARK OFFICE
CERTIFICATE OF CORRECTION

| | | |
|---|---|---|
| PATENT NO. | : 8,725,986 B1 | Page 1 of 5 |
| APPLICATION NO. | : 12/105609 | |
| DATED | : May 13, 2014 | |
| INVENTOR(S) | : Atul Goel | |

It is certified that error appears in the above-identified patent and that said Letters Patent is hereby corrected as shown below:

In the Specification:
Col. 4, line 56 should read:
~~FIG. 3 is a schematic block diagram of an exemplary mode~~
FIG. 3 is a schematic block diagram of an exemplary inode Col. 10, line 6 should read:
~~modes to describe the files. The WAFL file system uses files~~
inodes to describe the files. The WAFL file system uses files Col. 10, line 8 should read:
~~metadata files include, among others, an mode file. A file~~
metadata files include, among others, an inode file. A file Col. 10, line 9 should read:
~~handle, i.e., an identifier that includes an mode number, is~~
handle, i.e., an identifier that includes an inode number, is Col. 10, line 10 should read:
~~used to retrieve an mode from disk. A description of the~~
used to retrieve an inode from disk. A description of the Col. 10, line 11 should read:
~~structure of the file system, including on-disk modes and the~~
structure of the file system, including on-disk inodes and the Col. 10, line 12 should read:
~~mode file, is provided in the U.S. Pat. No. 5,819,292 entitled~~
inode file, is provided in the U.S. Pat. No. 5,819,292 entitled Signed and Sealed this
Twenty-second Day of July, 2014

Michelle K. Lee
*Deputy Director of the United States Patent and Trademark Office*

Col. 10, line 27 should read:
~~the mode file using the mode number to access an appropriate~~
<u>the inode file using the inode number to access an appropriate</u>

Col. 11, line 26 should read:
~~sented in the write-anywhere file system as an mode data~~
<u>sented in the write-anywhere file system as an inode data</u>

Col. 11, line 28 should read:
~~schematic block diagram of an mode 300, which preferably~~
<u>schematic block diagram of an inode 300, which preferably</u>

Col. 11, line 30 should read:
~~information stored in the meta-data section 305 of each mode~~
<u>information stored in the meta-data section 305 of each inode</u>

Col. 11, line 37 should read:
~~section 360 of each mode may be interpreted differently~~
<u>section 360 of each inode may be interpreted differently</u>

Col. 11, line 38 should read:
~~depending upon the type of file (mode) defined within the~~
<u>depending upon the type of file (inode) defined within the</u>

Col. 11, line 40 should read:
~~mode contains meta-data controlled by the file system,~~
<u>inode contains meta-data controlled by the file system,</u>

Col. 11, line 41 should read:
~~whereas the data section of a regular mode contains file sys-~~
<u>whereas the data section of a regular inode contains file sys-</u>

Col. 11, line 44 should read:
~~Specifically, the data section 360 of a regular on-disk mode~~
<u>Specifically, the data section 360 of a regular on-disk inode</u>

Col. 11, line 50 should read:
~~mode, file system data having a size that is less than or equal~~
<u>inode, file system data having a size that is less than or equal</u>

Col. 11, line 52 should read:
~~section of that mode. However, if the length of the contents of~~
<u>section of that inode. However, if the length of the contents of</u>

CERTIFICATE OF CORRECTION (continued)

U.S. Pat. No. 8,725,986 B1

Col. 11, line 54 should read:
~~KB, then the data section of the mode (e.g., a first level mode)~~
KB, then the data section of the inode (e.g., a first level inode)

Col. 11, line 59 should read:
~~the data section 360 of the mode (e.g., a second level mode)~~
the data section 360 of the inode (e.g., a second level inode)

Col. 11, line 63 should read:
~~64 MB, each pointer in the data section 360 of the mode (e.g.,~~
64 MB, each pointer in the data section 360 of the inode (e.g., Col. 11, line 64 should read:
~~a third level L3 mode) references a double-indirect block~~
a third level L3 inode) references a double-indirect block Col. 12, line 4 should read:
~~When an on-disk mode (or block) is loaded from disk 150~~
When an on-disk inode (or block) is loaded from disk 150

Col. 12, line 7 should read:
~~ing the mode 300 indicates the in-core representation of the~~
ing the inode 300 indicates the in-core representation of the Col. 12, line 8 should read:
~~on-disk mode structure. The in-core structure is a block of~~
on-disk inode structure. The in-core structure is a block of Col. 12, line 12 should read:
~~bit 370. After data in the mode (or block) is updated/modified~~
bit 370. After data in the inode (or block) is updated/modified Col. 12, line 14 should read:
~~marked "dirty" using the dirty bit 370 so that the mode (block)~~
marked "dirty" using the dirty bit 370 so that the inode (block)

Col. 12, line 17 should read:
~~including the modes and mode file, are disclosed and~~
including the inodes and inode file, are disclosed and Col. 12, line 28 should read:
~~(top-level) mode 402, such as an embedded mode, references~~
(top-level) inode 402, such as an embedded inode, references

CERTIFICATE OF CORRECTION (continued)
U.S. Pat. No. 8,725,986 B1

Col. 12, line 32 should read:
~~mode) contains pointers 405 that ultimately reference data~~
<u>inode) contains pointers 405 that ultimately reference data</u>

Col. 12, line 64 should read:
~~(e.g., Mode or indirect block). On a read path of a logical~~
<u>(e.g., inode or indirect block). On a read path of a logical</u>

Col. 12, line 67 should read:
~~which, in turn, points to an Mode file and its corresponding~~
<u>which, in turn, points to an inode file and its corresponding</u>

Col. 13, line 1 should read:
~~Mode buffer tree. The read path on a flexible volume is~~
<u>inode buffer tree. The read path on a flexible volume is</u>

Col. 13, line 14 should read:
~~other blocks, e.g., level 1(L1) indirect blocks. Mode file level~~
<u>other blocks, e.g., level 1(L1) indirect blocks, inode file level</u>

Col. 13, line 18 should read:
~~(top-level) Mode 502, such as an embedded Mode, references~~
<u>(top-level) inode 502, such as an embedded inode, references</u>

Col. 13, line 22 should read:
~~Mode) contain PVBN/VVBN pointer pair structures 508 that~~
<u>inode) contain PVBN/VVBN pointer pair structures 508 that</u>

Col. 14, line 41 should read:
~~Each fsinfo block 704 includes a block pointer to an mode file~~
<u>Each fsinfo block 704 includes a block pointer to an inode file</u>

Col. 14, line 42 should read:
~~706 that contains modes of a plurality of files, including an~~
<u>706 that contains inodes of a plurality of files, including an</u>

Col. 14, line 45 should read:
~~mode file 706 further includes a root directory 720 and a~~
<u>inode file 706 further includes a root directory 720 and a</u>

Col. 14, line 59 should read:
~~mode numbers. Each flexible volume 750 also has special~~
<u>inode numbers. Each flexible volume 750 also has special</u>

CERTIFICATE OF CORRECTION (continued)
U.S. Pat. No. 8,725,986 B1

Col. 14, line 60 should read:
~~reserved mode numbers within its flexible volume space that~~
reserved inode numbers within its flexible volume space that Col. 14, line 65 should read:
~~Specifically, each flexible volume 750 has the same mode~~
Specifically, each flexible volume 750 has the same inode Col. 15, line 6 should read:
~~turn, points to an mode file 760 that, as noted, has the same~~
turn, points to an inode file 760 that, as noted, has the same Col. 15, line 7 should read:
~~mode structure/content as the aggregate with the exceptions~~
inode structure/content as the aggregate with the exceptions Col. 15, line 8 should read:
~~noted above. Each flexible volume 750 has its own mode file~~
noted above. Each flexible volume 750 has its own inode file Col. 15, line 9 should read:
~~760 and distinct mode space with corresponding mode num-~~
760 and distinct inode space with corresponding inode num- In the Claims:
Claim 17, col. 22, line 53 should read:
~~structure; and~~
structure;

Claim 18, col. 23, line 3 should read:
~~required;~~
required; and

Claim 18, col. 23, line 10 should read:
~~taking a chunk modulo a repeat interval, wherein a is~~
taking a chunk modulo a repeat interval, wherein a table relative volume block number is